US009883057B2

(12) United States Patent
Kirihara et al.

(10) Patent No.: US 9,883,057 B2
(45) Date of Patent: Jan. 30, 2018

(54) PROCESSING APPARATUS AND PROGRAM PRODUCT FOR CREATING, IN RESPONSE TO USER INSTRUCTION, PROCESS RECEIVING PORTIONS TO BE DISPLAYED DIFFERENTLY AND TO PERFORM A DIFFERENT PROCESS

(71) Applicant: FUJI XEROX CO., LTD., Minato-ku, Tokyo (JP)

(72) Inventors: Kazuko Kirihara, Yokohama (JP); Yukio Tajima, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 132 days.

(21) Appl. No.: 14/275,312

(22) Filed: May 12, 2014

(65) Prior Publication Data
US 2015/0172487 A1 Jun. 18, 2015

(30) Foreign Application Priority Data

Dec. 12, 2013 (JP) ................................ 2013-257482
Dec. 12, 2013 (JP) ................................ 2013-257483

(51) Int. Cl.
*H04N 1/00* (2006.01)
*G06F 3/12* (2006.01)
(Continued)

(52) U.S. Cl.
CPC ....... *H04N 1/00387* (2013.01); *G06F 3/1204* (2013.01); *G06F 3/1205* (2013.01);
(Continued)

(58) Field of Classification Search
None
See application file for complete search history.

(56) References Cited

U.S. PATENT DOCUMENTS 5,604,860 A * 2/1997 McLaughlin ......... G06F 3/0483
715/810
6,567,627 B2 * 5/2003 Maeda ............... H04N 1/00352
399/81
(Continued)

FOREIGN PATENT DOCUMENTS

CN 101227543 A 7/2008
CN 102325231 A 1/2012
(Continued)

OTHER PUBLICATIONS

Communication dated Dec. 20, 2016, from the Japanese Patent Office in counterpart Japanese application No. 2013-257483.
(Continued)

*Primary Examiner* — Scott A Rogers
(74) *Attorney, Agent, or Firm* — Sughrue Mion, PLLC

(57) ABSTRACT

A processing apparatus includes: a processing unit that performs plural predetermined processes; a display unit; a creation unit that creates a first process receiving portion and a second process receiving portion, each of which receives an instruction to any one of the plural predetermined processes on the display unit; and an execution portion that executes the process, in a case where the instruction is received by the first process receiving portion, after receiving the instruction again, whereas, in a case where the instruction is received by the second process receiving portion, the execution portion executing the process without receiving the instruction again.

16 Claims, 26 Drawing Sheets

(51) Int. Cl.
  *G06K 15/02* (2006.01)
  *G06K 15/00* (2006.01)
(52) U.S. Cl.
  CPC .......... *G06F 3/1212* (2013.01); *G06F 3/1222* (2013.01); *G06F 3/1238* (2013.01); *G06F 3/1253* (2013.01); *G06F 3/1258* (2013.01); *G06F 3/1275* (2013.01); *G06F 3/1284* (2013.01); *G06K 15/002* (2013.01); *G06K 15/4095* (2013.01); *H04N 1/0097* (2013.01); *H04N 1/00389* (2013.01); *H04N 1/00395* (2013.01); *H04N 1/00411* (2013.01); *H04N 1/00424* (2013.01); *H04N 1/00474* (2013.01); *H04N 1/00482* (2013.01); *H04N 1/00503* (2013.01); *H04N 1/00514* (2013.01); *H04N 1/00517* (2013.01); *H04N 1/00854* (2013.01); *H04N 1/00875* (2013.01); *H04N 2201/0094* (2013.01)

(56) References Cited

U.S. PATENT DOCUMENTS

| | | | | |
|---|---|---|---|---|
| 6,785,487 | B2* | 8/2004 | Maeda | H04N 1/00352 399/81 |
| 7,536,646 | B2* | 5/2009 | Singh | G06F 9/44505 715/744 |
| 7,730,422 | B2* | 6/2010 | Russo | G06F 3/04817 715/788 |
| 7,911,626 | B2* | 3/2011 | Ferlitsch | H04N 1/00352 345/172 |
| 7,913,174 | B2* | 3/2011 | Kim | G06F 3/048 715/744 |
| 7,978,618 | B2* | 7/2011 | Richardson | H04N 1/00204 715/744 |
| 8,132,107 | B2* | 3/2012 | Honma | H04N 1/00244 715/827 |
| 8,271,890 | B2* | 9/2012 | Kunori | G06F 3/04845 399/81 |
| 8,595,650 | B2* | 11/2013 | Tomita | H04N 1/0035 358/1.13 |
| 8,654,378 | B2* | 2/2014 | Yoshida | H04N 1/00352 715/744 |
| 8,670,132 | B2* | 3/2014 | Abe | H04N 1/00514 358/1.13 |
| 8,938,691 | B2* | 1/2015 | Murata | H04N 1/00389 715/746 |
| 2002/0047815 | A1 | 4/2002 | Maeda et al. | |
| 2004/0080547 | A1* | 4/2004 | Goto | G06F 3/0238 715/827 |
| 2005/0254098 | A1* | 11/2005 | Matsuda | H04N 1/00209 358/440 |
| 2006/0221407 | A1* | 10/2006 | Uchida | H04N 1/00222 358/448 |
| 2007/0008573 | A1* | 1/2007 | Yamada | G06F 8/60 358/1.15 |
| 2007/0097074 | A1 | 5/2007 | Irimajiri | |
| 2007/0168654 | A1* | 7/2007 | Kotani | G06F 3/0238 713/150 |
| 2008/0022212 | A1* | 1/2008 | Kodimer | G06F 9/4443 715/744 |
| 2008/0178199 | A1 | 7/2008 | Tanabe | |
| 2008/0267654 | A1* | 10/2008 | Kawai | G03G 15/5016 399/81 |
| 2009/0006989 | A1* | 1/2009 | Park | G06F 8/38 715/762 |
| 2009/0305732 | A1* | 12/2009 | Marcellino | H04L 12/587 455/466 |
| 2010/0134817 | A1 | 6/2010 | Torii | |
| 2010/0287490 | A1 | 11/2010 | Ichimi | |
| 2011/0161867 | A1* | 6/2011 | Tomita | H04N 1/0035 715/835 |
| 2011/0279842 | A1* | 11/2011 | Abe | H04N 1/00514 358/1.13 |
| 2012/0023451 | A1 | 1/2012 | Kuroyanagi | |
| 2012/0179999 | A1* | 7/2012 | Nesladek | G06F 3/0488 715/835 |
| 2013/0027736 | A1 | 1/2013 | Kittaka | |
| 2013/0070295 | A1* | 3/2013 | Maruyama | H04N 1/00 358/1.15 |
| 2013/0074008 | A1 | 3/2013 | Umezawa et al. | |
| 2013/0201132 | A1* | 8/2013 | Kunioka | G06F 3/041 345/173 |
| 2014/0068454 | A1* | 3/2014 | Hirama | G06F 3/0484 715/744 |
| 2015/0334254 | A1* | 11/2015 | Kinoshita | H04N 1/0097 358/1.15 |

FOREIGN PATENT DOCUMENTS

| | | |
|---|---|---|
| CN | 102348030 A | 2/2012 |
| JP | 2000-244688 A | 9/2000 |
| JP | 2001-186237 A | 7/2001 |
| JP | 2002202692 A | 7/2002 |
| JP | 2007122516 A | 5/2007 |
| JP | 2010262501 A | 11/2010 |
| JP | 2011-051163 A | 3/2011 |
| JP | 2011-242854 A | 12/2011 |
| JP | 2012027662 A | 2/2012 |
| JP | 2013066031 A | 4/2013 |

OTHER PUBLICATIONS

Machine Translation of communication dated Feb. 28, 2017 issued by the Japanese Patent Office in counterpart Japanese application No. 2013-257482.

* cited by examiner

PREVIEW

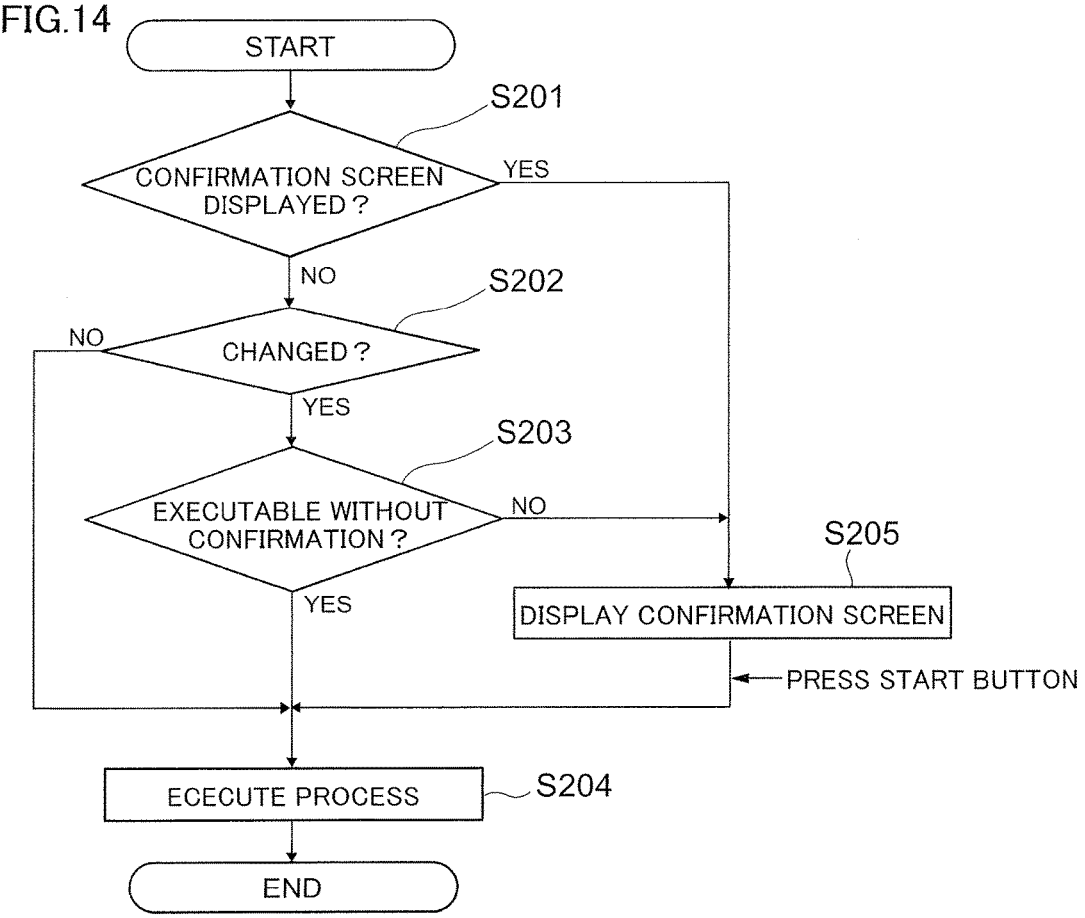

PROCESSING APPARATUS AND PROGRAM PRODUCT FOR CREATING, IN RESPONSE TO USER INSTRUCTION, PROCESS RECEIVING PORTIONS TO BE DISPLAYED DIFFERENTLY AND TO PERFORM A DIFFERENT PROCESS

CROSS REFERENCE TO RELATED APPLICATIONS

This application is based on and claims priority under 35 USC §119 from Japanese Patent Application No. 2013-257482 filed Dec. 12, 2013 and Japanese Patent Application No. 2013-257483 filed Dec. 12, 2013.

BACKGROUND

Technical Field

The present invention relates to a processing apparatus and a non-transitory computer readable medium storing a program.

Related Art

It is desired for a processing apparatus and a processing method to be capable of, in creating a process receiving portion, creating a process receiving portion that performs an execution operation of a process in accordance with a purpose of a user, compared to a case where it is only possible to select a single kind of operation when an instruction of a process is received.

SUMMARY

According to an aspect of the present invention, there is provided a processing apparatus including: a processing unit that performs plural predetermined processes; a display unit; a creation unit that creates a first process receiving portion and a second process receiving portion, each of which receives an instruction to any one of the plural predetermined processes on the display unit; and an execution portion that executes the process, in a case where the instruction is received by the first process receiving portion, after receiving an instruction again, whereas, in a case where the instruction is received by the second process receiving portion, the execution portion executing the process without receiving the instruction again.

BRIEF DESCRIPTION OF THE DRAWINGS

Exemplary embodiments of the present invention will be described in detail based on the following figures, wherein:

FIG. 6A is a diagram showing other setting items able to be set in box storage; and FIG. 6B is a diagram showing a display screen for inputting a file name;

FIG. 9A shows a screen when a mail is sent; FIG. 9B shows a screen for creating the one-touch selection button; and FIG. 9C shows a state in which the one-touch selection button is displayed on the home screen;

FIG. 14 is a flowchart showing an example of a process executed by a controller when the one-touch selection button is executed;

FIG. 15A shows a screen when a mail is sent; FIG. 15B shows a screen for creating the one-touch selection button; and FIG. 15C shows a state in which the one-touch selection button is displayed on the home screen;

FIG. 21A shows a state in which the first page of the home screen is displayed in the display part; and FIG. 21B shows a state in which the second page of the home screen is displayed in the display part;

FIG. 25A shows a state in which the first page of the home screen is displayed in the display part; and FIG. 25B shows a state in which the second page of the home screen is displayed in the display part.

DETAILED DESCRIPTION

Hereinafter, exemplary embodiments according to the present invention will be described with reference to attached drawings.

First Exemplary Embodiment

Figure 1:
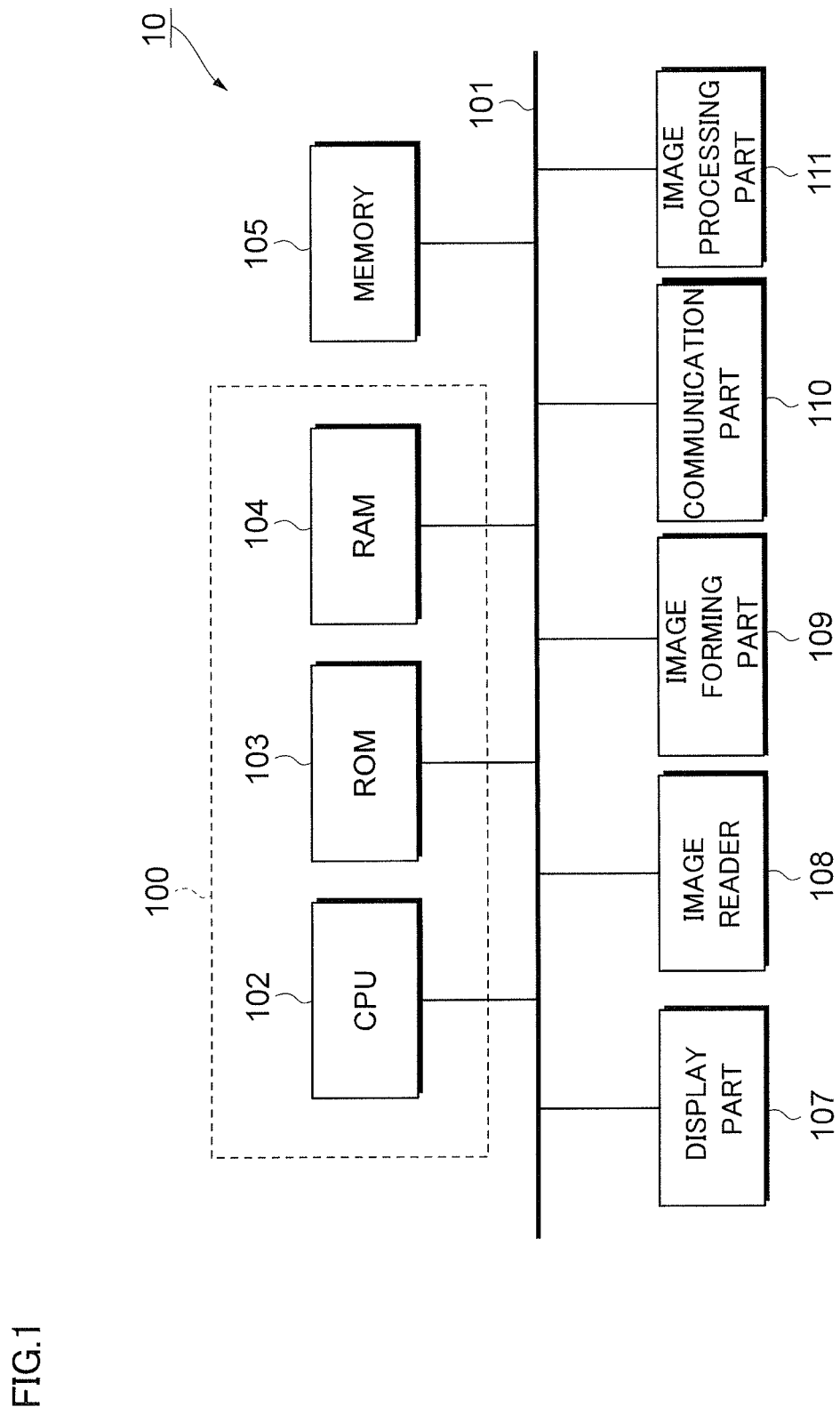
FIG. 1 is a block diagram exemplifying a hardware configuration of an image forming apparatus related to a first exemplary embodiment according to the present invention.

FIG. 1 is a block diagram exemplifying a hardware configuration of an image forming apparatus 10 according to the present invention. The image forming apparatus 10 is provided with a controller 100, a memory 105, a display part 107, an image reader 108, an image forming part 109, a communication part 110 and an image processing part 111. It should be noted that each of these functional parts is connected to a bus 101, and data transmission and reception are performed via the bus 101.

The controller 100 performs control of each of the above-described functional parts provided in the image forming apparatus 10. Here, the controller 100 is configured with a CPU (central processing unit) 102, a ROM (read only memory) 103 and a RAM (random access memory) 104. The ROM 103 stores a control program executed by the CPU 102. The CPU 102 reads the control program stored in the ROM 103 and executes the control program using the RAM 104 as a work area.

When the control program is executed by the CPU 102, the memory 105, the display part 107, the image reader 108, the image forming part 109, the communication part 110 and the image processing part 111, which are the functional parts of the image forming apparatus 10, are controlled. Accordingly, for example, predetermined display is performed on the display part 107, or, image formation on a recording medium, such as a sheet, is performed. Moreover, reading of a document set on the image reader 108, etc., is performed. The controller 100 is an example of a processing unit, creation unit and an execution portion.

It should be noted that the program executed by the CPU 102 can be provided in a state of being stored in a computer-readable recording medium, such as a magnetic recording medium (a magnetic tape, a magnetic disk, etc.), an optical recording medium (an optical disk, etc.), a magneto-optical recording medium and a semiconductor memory. Moreover, the program may be downloaded to the image forming apparatus 10 by use of a communication tool such as the Internet.

The display part 107 is configured with, for example, a touch panel display of a liquid crystal and displays data related to, for example, the image forming apparatus 10 under the control of the controller 100. Moreover, the display part 107 displays a display screen for receiving an operation by a user, and receives the operation by the user via the display screen. It should be noted that, by inputting information for identifying a user, a display screen for the user is displayed.

As the input of the information for identifying a user, for example, a method in which an ID card that records an identification number (an ID (identification) number) assigned to each user and is owned by the each user is held over, for example, a not-shown ID card reader, to thereby cause the ID card reader to read an ID number recorded in the ID card, a method in which an identification number or a password registered for each user is inputted to a display screen by the user by oneself, and the like may be applied. The information for identifying a user may be inputted by other methods. The display part 107 displays a one-touch selection button 21, a selection button 21 or the like in a display region in the display screen.

The image reader 108 includes an image reading device (a scanner) that reads a document and generates image data representing an image of the document having been read and obtained, and outputs generated image data to the image processing part 111.

The image forming part 109 includes an image forming mechanism that forms a toner image corresponding to the image data onto a recording medium, such as a sheet, by an electrophotographic system or the like. The communication part 110 is connected to a not-shown communication line, to thereby function as a communication interface performing communications with other devices connected to the communication line. The image processing part 111 performs image processing such as color correction or halftone correction on the image data to be inputted, and generates image data having been subjected to the image processing and outputs thereof to the image forming part 109. The memory 105 includes a memory device such as a hard disk device, and stores, for example, data received by the communication part 110 or data generated in the image forming apparatus 10.

Figure 2:
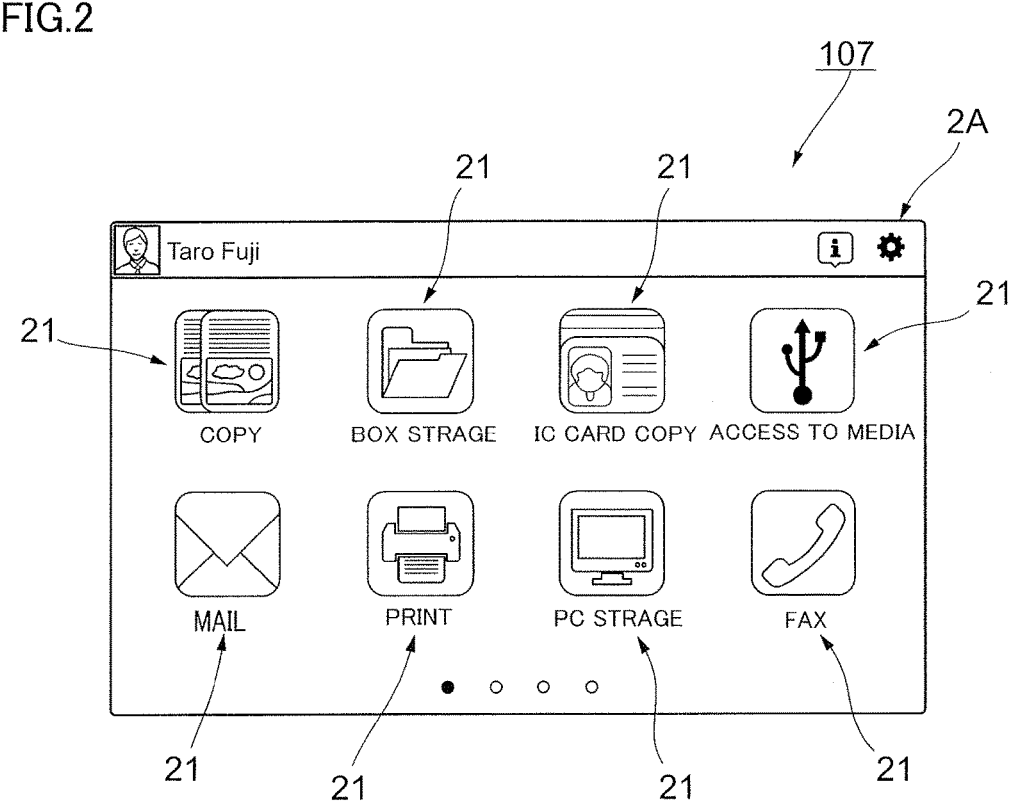
FIG. 2 is a diagram showing a display example in a display part.

FIG. 2 is a diagram showing a display example in the display part 107. In the display part 107, by an input of information for identifying a user, a home screen shown in the figure is displayed as an example of a display screen registered for the user. The home screen shown in the figure includes a display of "Taro Fuji" on a top left portion of the display screen, which is a display screen for an identified user "Taro Fuji".

In the home screen, plural selection buttons 21 indicated by icons are displayed, and when a user selects any of the selection buttons 21 (presses the touch panel), a process associated with the selection button 21 is received and a function corresponding to the process is executed. The selection buttons 21 are an example of the process receiving unit.

Specifically, in the home screen shown in FIG. 2, the selection buttons 21 corresponding to respective kinds of processes "copy", "box storage", "ID card copy", "access to media", "mail", "print", "PC storage" and "fax" are displayed. In the exemplary embodiment, when any of these selection buttons 21 is selected by a user, a screen for performing detailed settings or confirmations of the process corresponding to the selected selection button 21 is further displayed. Thereafter, by pressing a predetermined button, such as a start button, by the user, a process of copying or the like is started.

The home screen of the exemplary embodiment is configured with plural pages, and is controlled by the controller 100 so that, when a user pushes out a so-called "background" portion, which is the portion other than the selection buttons 21 in the display screen shown in FIG. 2, toward the left in the figure while pressing the "background" portion, the display screen is switched to a display screen of another page. In other words, in the exemplary embodiment, by a so-called flicking operation, switching of pages of the home screen is executed. After the page switching is performed, other selection buttons 21 that have not appeared in the page before the flicking operation is performed come to appear.

Moreover, in the display part 107 of the exemplary embodiment, it is possible to move each of the selection buttons 21 by operation. Specifically, the selection button 21 can be moved by a user moving his/her finger while pressing the selection button 21 by the finger. In other words, in the exemplary embodiment, movement of the selection button 21 is executed by a drag-and-drop operation.

In the exemplary embodiment, if any one of the selection buttons 21 is continuously pressed for a predetermined time or more, or a gear-shaped mark positioned at the top right of the screen (a mark indicated by a reference sign 2A) is pressed in a state where any one of the selection buttons 21 is selected, the display screen is switched to enable detailed settings of the process associated with the selection button 21.

Figure 3:
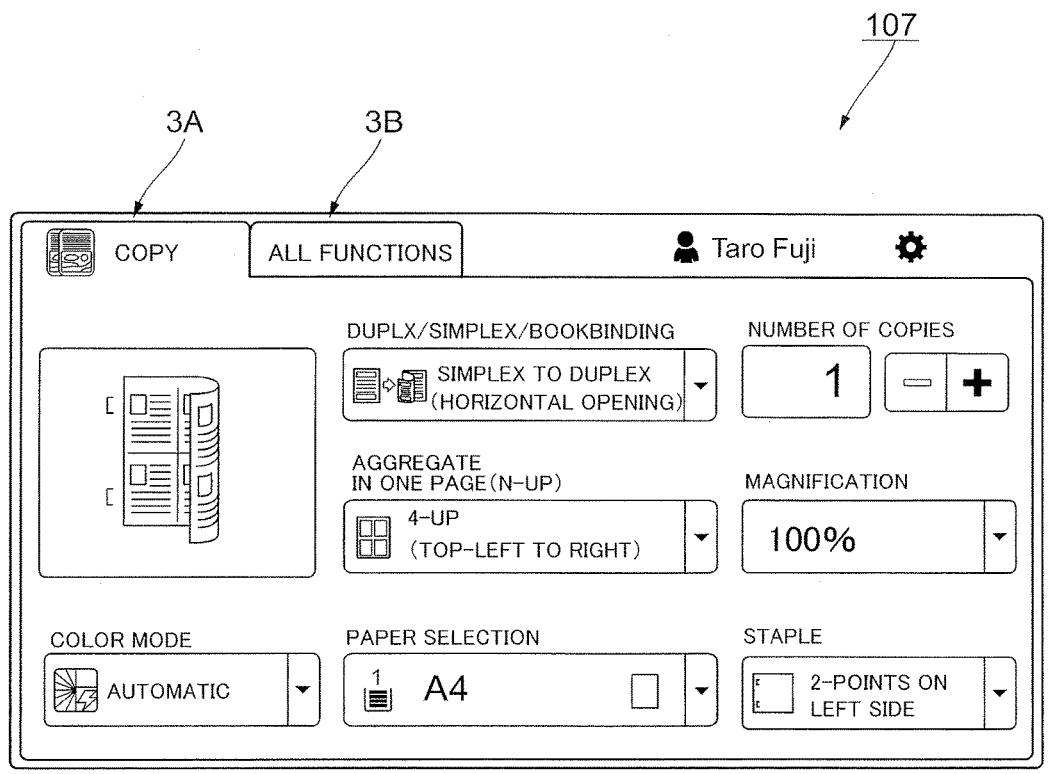
FIG. 3 is a diagram showing an example of a display screen after a selection button "copy" on a home screen shown in FIG. 2 is selected by a user.

FIG. 3 is a diagram showing a display screen after the selection button 21 for "copy" shown in FIG. 2 is selected (pressed) by a user. As indicated by reference signs 3A and 3B, the display screen has a configuration provided with two tabs (hereinafter, referred to as "first tab 3A" and "second tab 3B"). If there are only two tabs like this, a button required by the user (a button to be operated) exists in one of the two tabs.

That is, even if the button required by the user (the button to be operated) does not exist in the displayed tab, by moving to the other tab, the button required by the user surely exists in the destination tab. Consequently, compared to the case where there are not less than three tabs, such as four or five tabs, the user can reduce the number of times of moving to the tabs until the tab in which the required button (the button to be operated) exists is selected. In other words, if there are many tabs, it becomes difficult to grasp which function is included in which tab; however, as in the exemplary embodiment, if there are only two tabs, it becomes easy to grasp in which tab the required function exists.

Here, in the display part 107, in the state where the first tab 3A is selected, setting items such as "duplex/simplex/bookbinding", "number of copies", "number of N-ups (number of pages aggregated in one page)", "magnification", "color mode", "sheet selection" and "stapling" are displayed as shown in FIG. 3. In other words, in the exemplary embodiment, in the display screen when the first tab 3A is selected, the setting items that are assumed to be relatively and frequently changed by the user are displayed. On the other hand, the setting items that are not assumed to be relatively and frequently changed by the user are displayed, as shown in FIG. 4 (a diagram showing a display example in the display part 107), in a display screen when the second tab 3B is selected.

Figure 4:
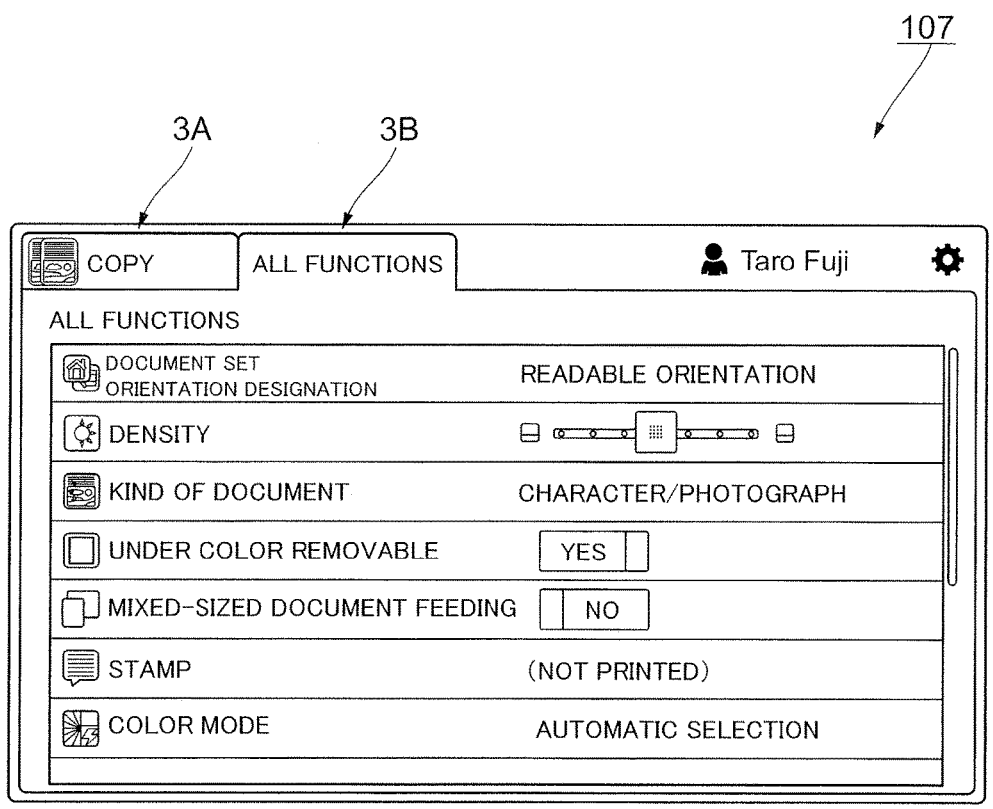
FIG. 4 is a diagram showing a display example in the display part.

In the display screen shown in FIG. 4, the setting items (the items to be set by the user) are arranged in the vertical direction of the screen to be displayed. In other words, the setting items are displayed in a form of a list. It should be noted that, in the display screen shown in FIG. 4, hidden setting items are displayed by scrolling in a downward direction in the figure.

Here, in the display screen when the second tab 3B is selected, by scrolling in a single direction (the downward direction in the figure), other setting items are also displayed. This allows the user to easily find a setting item which he/she seeks. For example, it is also considered that the setting items are displayed in the forms of buttons, and are arranged in a lattice shape; however, in this case, the user is required to turn his/her eyes not only in the vertical direction, but also in the horizontal direction.

On the other hand, in the exemplary embodiment, since the setting items are displayed by scrolling in one direction (the vertical direction), the moving direction of user's eye becomes one direction. Accordingly, in the exemplary embodiment, it is possible to limit the moving direction of user's eyes compared to the case where the user's eyes move in the two directions.

Figure 5:
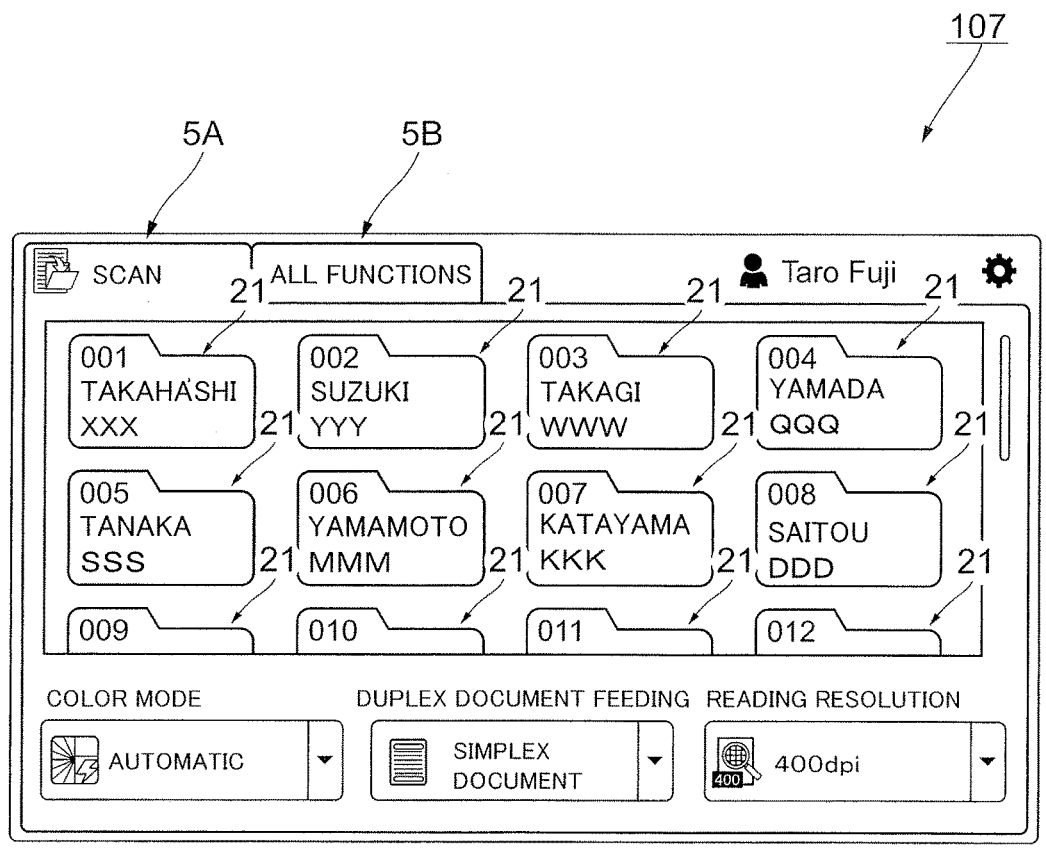
FIG. 5 is a diagram showing an example of the display screen when a selection button "box storage" on the home screen shown in FIG. 2 is selected.

FIG. 5 is a diagram showing a display screen when the selection button "box storage" on the home screen shown in FIG. 2 is selected by a user. When "box storage" on the home screen is selected by the user, the home screen is switched to the display screen in which plural selection buttons 21 are displayed, each of which is assigned a user's name, as shown in FIG. 5. Similar to the display screen when the selection button 21 for "copy" is selected by a user (refer to FIGS. 3 and 4), the display screen has a configuration provided with two tabs (hereinafter, referred to as "first tab 5A" and "second tab 5B"). It should be noted that FIG. 5 shows a state where the first tab 5A is selected.

Moreover, the exemplary embodiment is configured so that, when the display screen is switched by user's selection of "box storage", a display screen corresponding to the first tab 5A is displayed at first. In the exemplary embodiment, by user's selection of the second tab 5B in a state where the display screen corresponding to the first tab 5A is displayed, the display screen corresponding to the second tab 5B is displayed.

Here, the box storage refers to a process that stores image data generated by reading a document by use of the image reader 108 in a box set in the memory 105 (refer to FIG. 1). At that time, by selecting any one of the selection buttons 21 shown in FIG. 5 by the user, a storing destination of the image data is designated, and the image data is stored in the designated storing destination.

It should be noted that, until selection of the storing destination is carried out, each of the selection buttons 21 shown in FIG. 5 is in an unselected, namely, an off state (having a color substantially the same as the color of "background"). Then, selection of the storing destination is carried out, the selected selection button 21 becomes an on state, which is a selected state, and the color of the button is changed to another color to make the user recognize the on state. Moreover, in the display screen shown in FIG. 5, in the lowermost portion of the screen, the setting items frequently changed by the user ("color mode", "document feeding mode" and "reading resolution") are displayed. These setting items are configured so that the contents thereof are changed without switching the screen (without selecting the second tab 5B).

Figure 6:
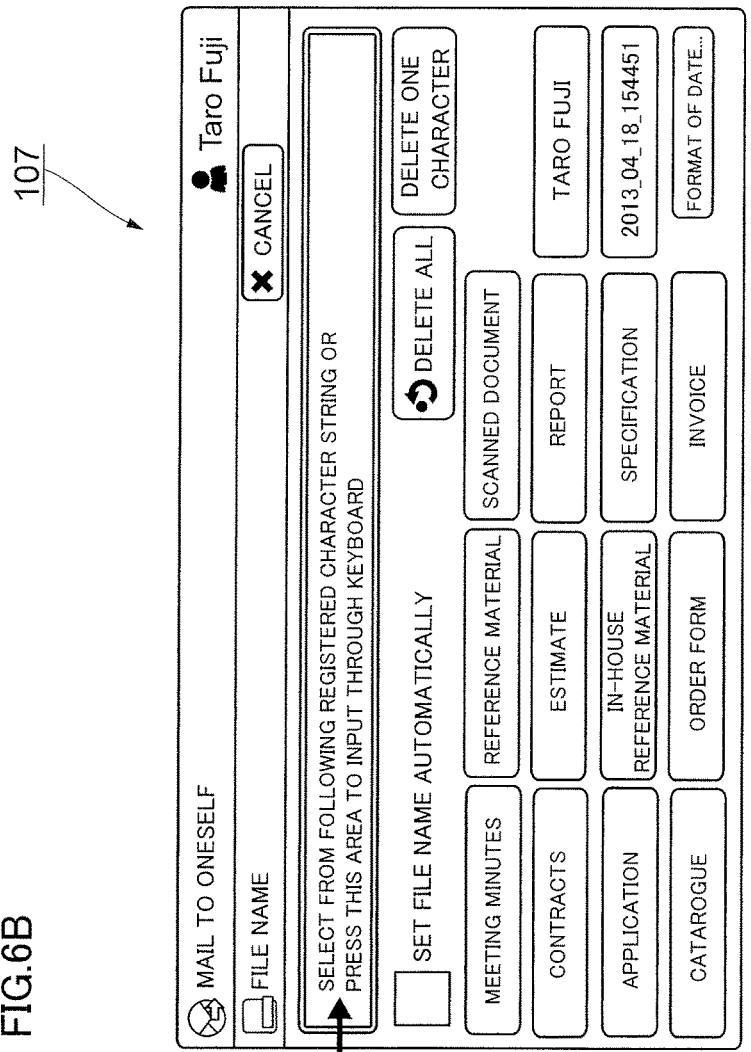
FIGS. 6A and 6B are diagrams showing examples of the display screen when a second tab is selected.

FIGS. 6A and 6B are diagrams showing the display screens when the second tab 5B is selected. As shown in FIG. 6A, in the case where the second tab 5B is selected, other setting items capable of being set in performing the box storage are displayed. It should be noted that, in this case also, the setting items similar to those described above are displayed in a form of a list. Here, in the exemplary embodiment, it is possible to assign a file name to every document read by the image reader 108.

Moreover, in the exemplary embodiment, when the setting item "file name" in FIG. 6A is selected, a display screen for inputting a file name is displayed as shown in FIG. 6B. In the exemplary embodiment, the user inputs a desirable file name via the display screen.

Next, personal print will be described. In the personal print, image data generated by a PC (personal computer) owned by a user is transmitted to the image forming apparatus 10 and is temporarily stored in the memory 105 (refer to FIG. 1) of the image forming apparatus 10. Then, the user inputs a starting instruction via the display part 107, to thereby start image formation onto a sheet or the like.

In the personal print, since image formation is carried out in a state where the user is in the immediate neighborhood of the image forming apparatus 10, the user is able to obtain printed matter immediately after the printed matter is printed. In such a case, it rarely happens that a person other than the user obtains the printed matter. When the personal print is carried out, the home screen shown in FIG. 2 is operated, the selection button for "personal print" (not shown in FIG. 2) is selected by the user. When the selection button for "personal print" is selected, the home screen is switched to the display screen shown in FIG. 7 (a diagram showing a display screen after "personal print" is selected).

Figure 7:
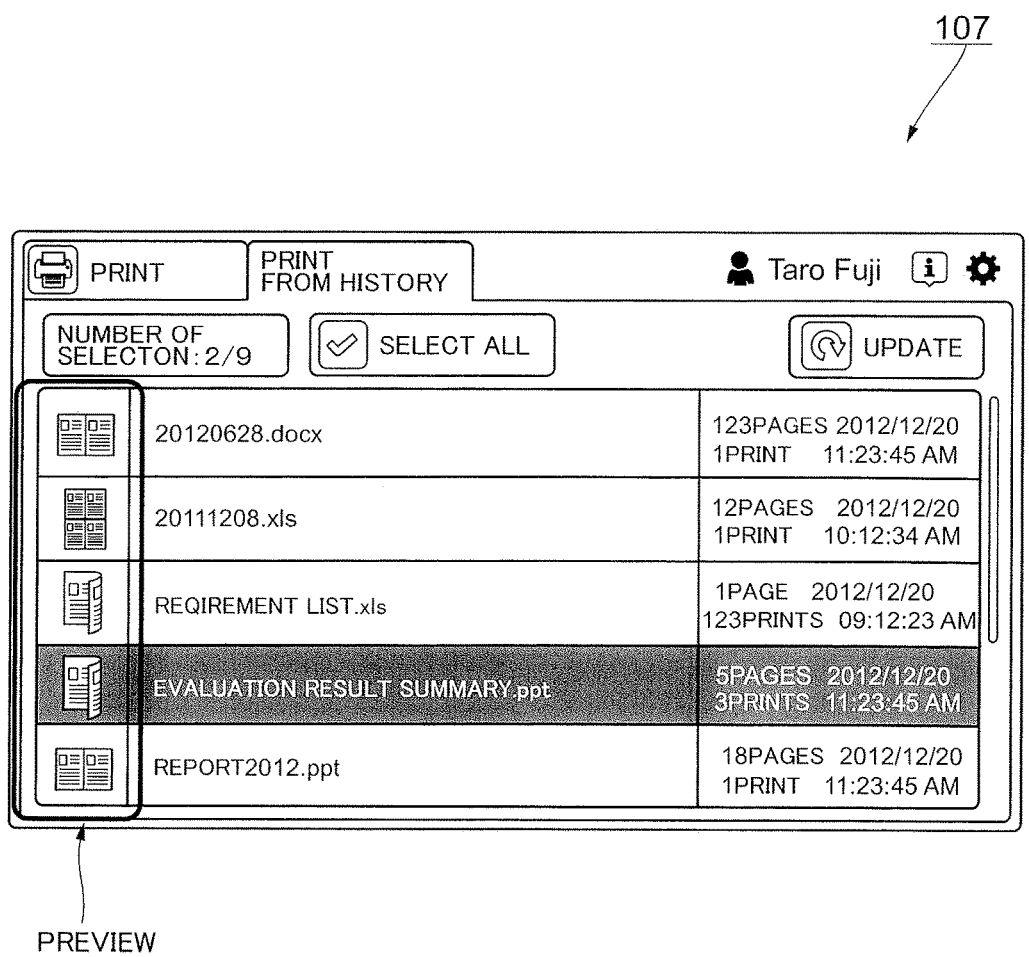
FIG. 7 is a diagram showing an example of the display screen after a selection button "personal print" is selected.

Here, in the display screen after switching shown in FIG. 7, file names of plural pieces of image data (print jobs) stored in the memory 105 are displayed in a form of a list. In other words, in the display part 107, file names are displayed in a state of being arranged in the vertical direction. Moreover, at the left of the file name in the figure, a preview screen indicating a state of a printed sheet is displayed.

Figure 8:
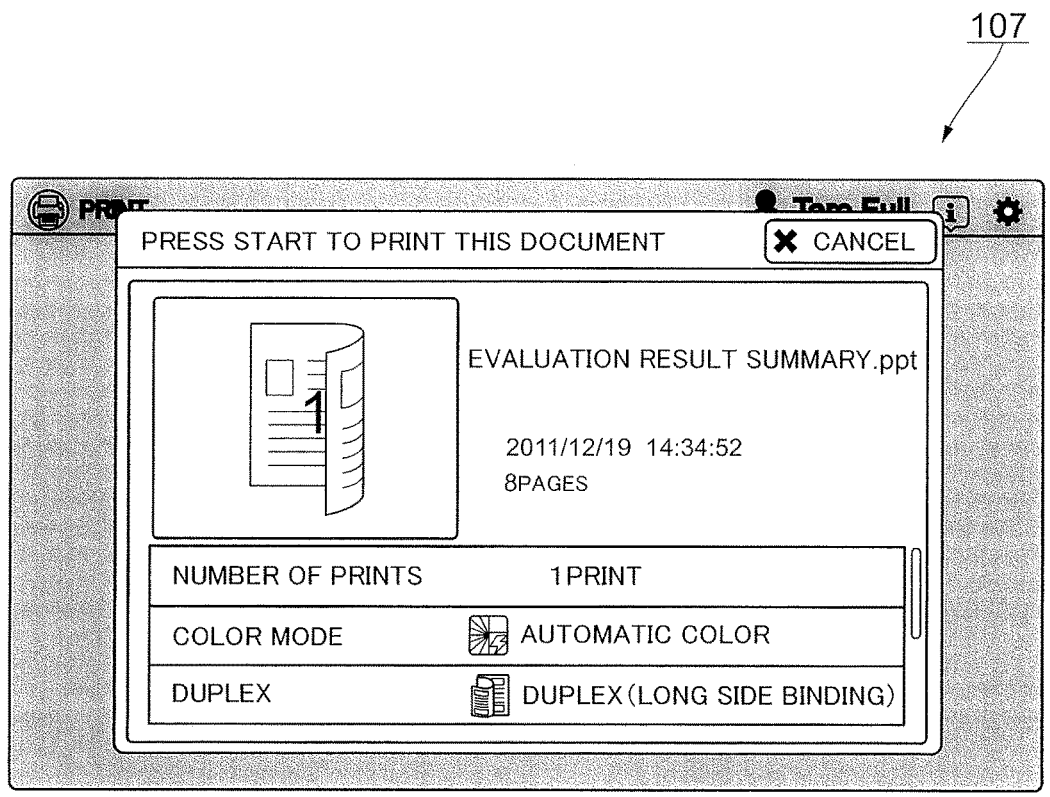
FIG. 8 is a diagram showing an example of the display screen after a file is selected.

When one of the plural files shown in FIG. 7 is selected, the display screen is switched to a screen shown in FIG. 8 (a diagram showing a display screen after a file is selected). In the display screen, setting items are displayed in a lower half of the screen. Specifically, in this specific example, three setting items, namely, "number of prints", "color mode" and "whether duplex printing is needed" are displayed.

Further, at the top right of the display screen, a file name is displayed, and at the top left of the display screen, a preview screen indicating a state of a printed sheet is displayed. It should be noted that, in the exemplary embodiment, each of the above-described three setting items can be changed in the display screen shown in FIG. 8, and when the change is carried out, the preview screen is also changed in accordance with the change. That is, in the exemplary embodiment, the preview screen is dynamically changed in accordance with the change of the setting item.

Here, in the exemplary embodiment, the files are displayed in the form of a list in this manner, and the user selects the file to be printed. Then, the selected file is printed.

It should be noted that, though illustration is omitted, in the exemplary embodiment, a selection button 21 for "personal batch print" is prepared on the home screen. When this selection button 21 is pressed, batch printing of not-yet-outputted accumulated documents (files) is carried out. That is, in the exemplary embodiment, with regard to the personal print, two kinds of selection buttons 21, namely, "personal print (displayed in a list)" and "personal batch print" are prepared.

Incidentally, in the image forming apparatus 10 in the exemplary embodiment, other than the selection buttons 21 having already been prepared, a user is able to create a new selection button 21 by the control of the controller 100. For example, processes frequently carried out by a user are able to be registered as new selection buttons 21 with parameters such as a transmission destination and a number of copies being set. By selecting (pressing) those registered selection buttons 21 by the user, the contents of the registered processes can be called, and thereby it becomes possible to omit operations of detailed setting of parameters, which have been conducted every time the processes are carried out.

The selection button 21 newly created and registered by the user in this manner is hereinafter referred to as "one-touch selection button 21". In the exemplary embodiment, as will be described later, a one-touch selection button 21 for direct start as an example of a second process receiving portion and a one-touch selection button 21 for non-direct start as an example of a first process receiving portion can be created as the one-touch selection button 21.

When a user only selects the one-touch selection button 21 for the direct start, after an instruction for the process associated with the button is received by the controller 100, the one-touch selection button 21 for the direct start starts the process without receiving further instructions. In other words, in the one-touch selection button 21, selection operation by the user directly becomes an operation of starting a process without requesting the user to confirm the start of the process after the selection is once conducted by the user.

On the other hand, when a user selects the one-touch selection button 21 for the non-direct start, after an instruction for the process associated with the button is received by the controller 100 and before the start of the process, parameters or the like set in the one-touch selection button 21 are shown for the user. Then, after the user confirms the shown parameters, further instructions are received by inputting an operation for starting the process, and thereafter, the process is started. The one-touch selection button 21 for the non-direct start is hereinafter also referred to as "one-touch selection button 21 for displaying confirmation screen".

In the screen for confirmation displayed by selection of the one-touch selection button 21 for displaying confirmation screen, it is possible for a user to select not only inputting a start of a process, but also inputting a cancellation of a process. If the inputting of a cancellation is carried out, a process associated with the selected on-touch selection button 21 is not executed.

Here, changes in the display screen when the one-touch selection button 21 is created by a user will be described with reference to FIGS. 9A to 9C. It should be noted that FIGS. 9A to 9C show rough outlines of the changes in the display screen.

Figure 9A:
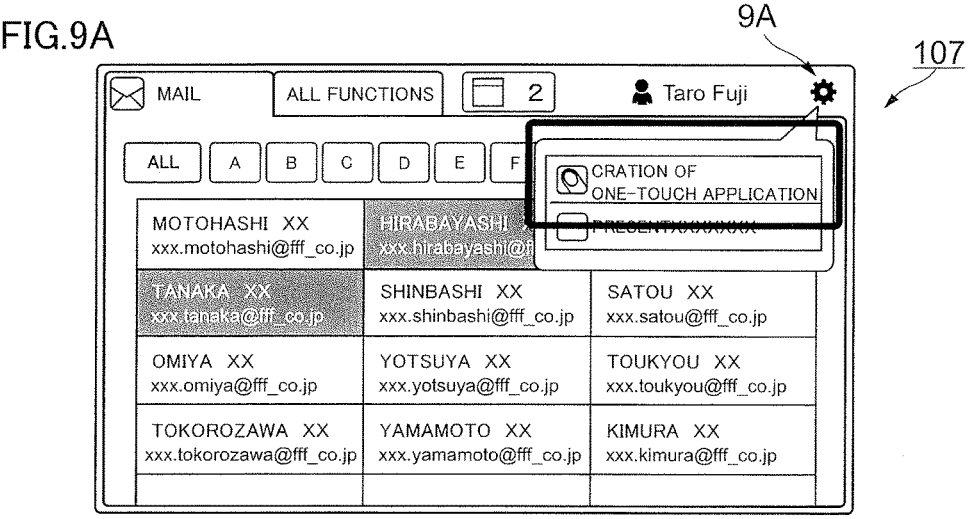
FIGS. 9A to 9C are diagrams showing examples of the display screen when a user creates a one-touch selection button.

At first, on the home screen, when a user selects the selection button 21 for "mail" as a kind of the processes, a screen shown in FIG. 9A is displayed as a screen for receiving detailed settings of the "mail" process. Then, the gear-shaped mark (the mark indicated by the reference sign 9A) positioned at the top right of the screen is pressed by the user.

Figure 9B:
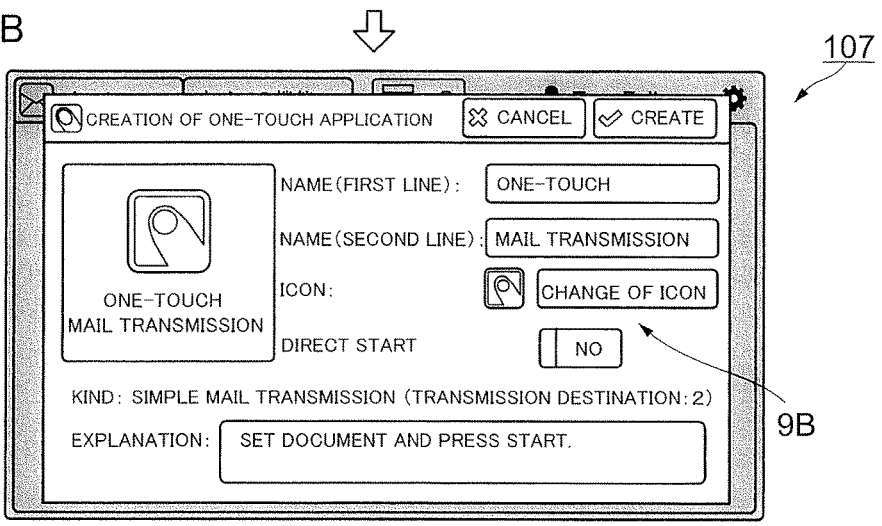
Figure 9C:
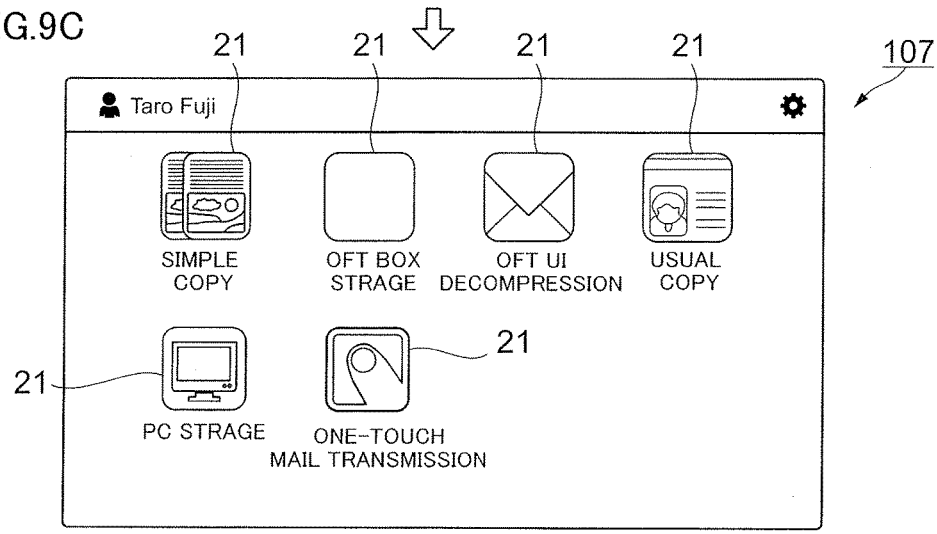

When the gear-shaped mark 9A is pressed in the display screen in the state of receiving the detailed settings, by the control of the controller 100, a screen for creating the one-touch selection button 21 as shown in FIG. 9B is displayed. In the creation screen in FIG. 9B, information required to create the one-touch selection button 21 (such as parameters) is inputted by the user. Specifically, as a name of the one-touch selection button 21, "name (first line)" and "name (second line)" are inputted by the user.

The name of the one-touch selection button 21 in the exemplary embodiment is represented by a name of two lines. "Name (first line)" shows a name displayed in an upper line of the two lines, whereas, "name (second line)" shows a name displayed in a lower line of the two lines.

Figure 10:
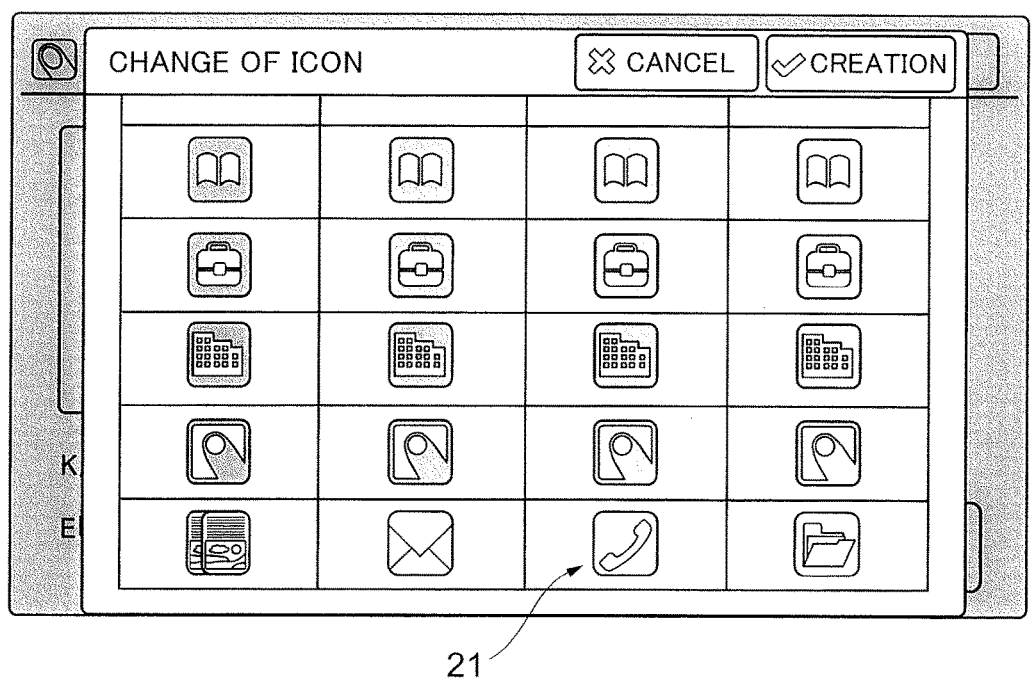
FIG. 10 is a diagram showing an example of a list of the one-touch selection buttons.

Moreover, in the creation screen shown in FIG. 9B, a design to become an icon for displaying the one-touch selection button 21 is also displayed. The design can be changed by pressing a button 9B, with which a process of changing the design is associated, by the user. That is, when the button 9B is pressed by the user, a screen shown in FIG. 10 (a screen showing a list of designs of the one-touch selection button 21) is displayed. The user select a design as the one-touch selection button 21 from the list of the designs shown in the screen, and accordingly, the selected design for the one-touch selection button 21 is registered as an icon.

Further, in the creation screen shown in FIG. 9B, there is a slide button about the direct start to set whether the one-touch selection button 21 is the one-touch selection button 21 for the direct start or the one-touch selection button 21 for displaying the confirmation screen; however, this will be described later. It should be noted that, in the creation screen shown in FIG. 9B, the one-touch selection button 21 is set not to carry out the direct start.

Moreover, in the exemplary embodiment, a user is able to register explanations, and a user who wants to register explanations inputs the explanations within a box positioned at a lower portion of the creation screen shown in FIG. 9B.

When input by the user to the creation screen shown in FIG. 9B is completed, a button called "creation" positioned at top right of the screen is pressed by the user. Consequently, by the control of the controller 100, a display on the display part 107 is switched to a screen shown in FIG. 9C (the home screen), and a one-touch selection button 21 named "one-touch mail transmission" is added to the display screen.

Here, the process of creating the one-touch selection button 21 for the non-direct start has been described; however, in the exemplary embodiment, a start button for starting a process after displaying a confirmation screen by selecting the one-touch selection button 21 for displaying the confirmation screen is not displayed on the display screen, but is arranged as a button of hardware (not shown) in any other location of the image forming apparatus 10.

Moreover, in the exemplary embodiment, there is a case where the one-touch selection button 21 for the direct start can be created by operating the slide button for the direct start; however, details thereof will be described later. The created one-touch selection button 21 for the direct start is, when displayed on the home screen, distinguishable from selection buttons other than the one-touch selection button 21 for the direct start (the one-touch selection button 21 for displaying the confirmation screen or ordinary selection buttons 21).

That is to say, to the design of the one-touch selection button 21 for the direct start displayed on the home screen, for example, a rhombus-shaped mark 9E shown in FIG. 13, which will be described later, is added. The rhombus-shaped mark 9E simulates a mark attached to a start button of hardware provided to the image forming apparatus 10 (a button to provide an instruction for starting processes corresponding respective functions by being pressed by a user), and the one-touch selection button 21, to which the mark 9E is added, easily causes the user to evoke pressing the start button, namely, start of a process by being selected. It should be noted that, in the exemplary embodiment, description has been given to the display process in the image forming apparatus 10; however, the display process is able to be executed in a similar way in apparatuses other than the image forming apparatus 10 (for example, an apparatus such as a tablet).

Figure 11:
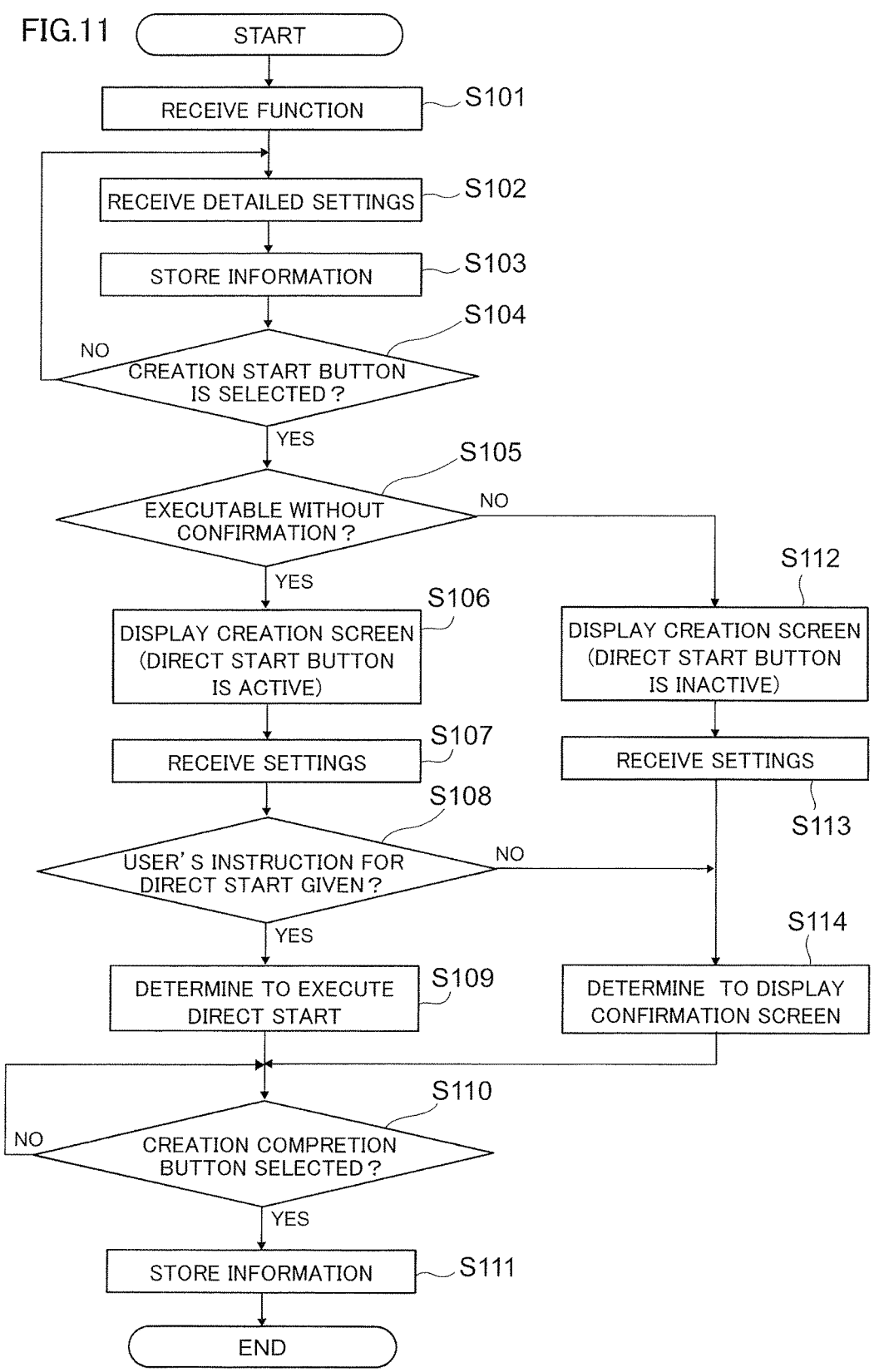
FIG. 11 is a flowchart showing an example of a process executed by a controller when the one-touch selection button is created.
Figure 12:
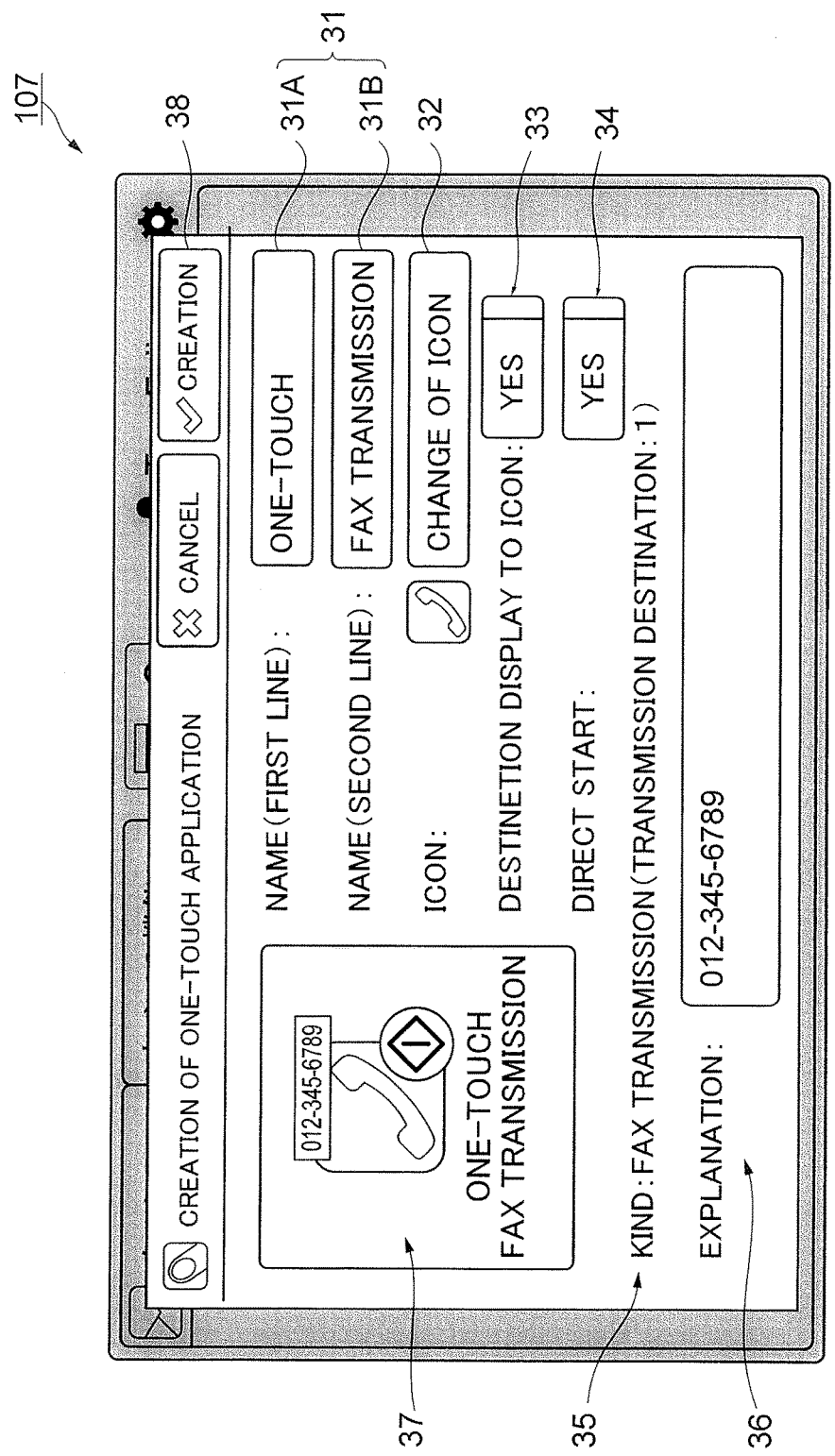
FIG. 12 is a diagram showing a creation screen displayed on the display part when the one-touch selection button is created.

Subsequently, the process of creating the one-touch selection button 21 will be described in more detail. FIG. 11 is a flowchart showing a process executed by the controller 100 (refer to FIG. 1) when the one-touch selection button 21 is created. FIG. 12 is a diagram showing a display screen displayed on the display part 107 when the one-touch selection button 21 is created. In this specific example, description will be given by taking a case of creating a selection button 21 related to a fax transmission function as an example.

As shown in FIG. 11, when a selection button 21 is to be newly created, the controller 100 receives an input about a function (a process) to be associated with the selection button 21 to be newly created from a user (step 101). Specifically, when the selection button 21 is newly created, the user selects (presses) a selection button 21 representing the function to be associated with the selection button 21 to be newly created on the home screen shown in the above-described FIG. 2. In this specific example, the user first selects a selection button for "fax" on the home screen for the user shown in FIG. 2.

If the selection button 21 is pressed (selected) by the user on the home screen, the screen for performing detailed settings about the function associated with the selected selection button 21, which is shown in FIGS. 3 to 6A and 6B, is displayed in the display part 107 by the controller 100. In the specific example, also in the case where the selection button 21 for "fax" is selected, the screen for performing detailed settings about the fax function is similarly displayed in the display part 107 by the controller 100.

In other words, though detailed description is omitted, the screen for performing settings about the fax function also has a configuration provided with a first tab and a second tab. In the configuration, setting items that are frequently changed by the user are displayed in the first tab, whereas, all the setting items are displayed in a form of a list in the second tab. The configuration of the first tab or the second tab is similar to the screen for performing settings about the copy function shown in FIGS. 3 and 4 or the screen for performing settings about the box storage function shown in FIGS. 5, 6A and 6B.

Then, the user performs settings of each item related to the function associated with the selection button 21 to be newly created by use of the screen displayed in the display part 107, and the controller 100 receives those settings (step 102) and causes the memory 105 to store the contents of the received settings (step 103). In the exemplary embodiment, in which the fax function is selected, the user performs detailed settings of, for example, "transmission destination", "image quality", "magnification" and the like.

In the case where the copy function is selected as a kind of process, the user performs detailed settings of, for example, "duplex/simplex/bookbinding", "number of copies", "number of N-ups (number of pages aggregated in one page)", "magnification", "color mode" and the like. Moreover, in the case where the box storage function is selected, the user performs detailed settings of, for example, "color mode", "document feeding mode", "reading resolution" and the like.

It should be noted that, with respect to "transmission destination", which is an item of the detailed settings, it is possible to set one or more transmission destinations in creating a single one-touch selection button 21; however, in this specific example, it is assumed that a single transmission destination is set by the user.

Subsequently, the controller 100 determines whether or not a button for starting creation of a one-touch selection button 21 (a button same as the gear-shaped mark 9A shown in FIG. 9A, hereinafter referred to as a creation start button 9A) is selected by a user (step 104). It should be noted that, if the creation start button 9A is not selected (NO in step 104), the controller 100 receives the detailed settings until the creation start button 9A is selected (step 102), and stores information of the received detailed settings in the memory 105 (step 103).

Next, in the case where the controller 100 determines that the creation start button 9A is selected (YES in step 104), the controller 100 causes the display part 107 to display a display screen for confirming and changing the contents of settings of the one-touch selection button 21 to be newly created (hereinafter referred to as a one-touch selection button creation screen, or simply referred to as a creation screen) (step 106, step 112).

Specifically, the controller 100 causes the display part 107 to display a creation screen corresponding to the function (including the information of detailed settings) associated with the one-touch selection button 21 to be newly created, which has been inputted by the user in step 101. In this specific example, as shown in FIG. 12, the controller 100 causes the display part 107 to display a creation screen corresponding to the fax function selected in step 101.

As the creation screen displayed by the display part 107, there are two kinds, namely, a creation screen that provides permission to create the one-touch selection button 21 for the direct start, and a creation screen that prohibits creation of the one-touch selection button 21 for the direct start and provides permission to create only the one-touch selection button 21 for the non-direct start. In accordance with the kind of process selected in step 101 and the contents of detailed settings received in step 102 and stored in the memory 105 in step 103, the controller 100 causes the display part 107 to display any one of the two kinds of creation screen (step 105, step 106 and step 112).

Specifically, when the contents of the process stored in the memory 105 satisfy preset conditions (YES in step 105), the creation screen that provides permission to create the one-touch selection button 21 for the direct start is displayed in the display part 107 (step 106). On the other hand, when the contents of the process stored in the memory 105 do not satisfy the preset conditions (NO in step 105), the creation screen that prohibits creation of the one-touch selection button 21 for the direct start and provides permission to create only the one-touch selection button 21 for the non-direct start is displayed in the display part 107 (step 112).

Here, in a case where the one-touch selection button 21 is for the direct start, if the one-touch selection button 21 is erroneously selected and a process associated therewith is inadvertently executed, a serious effect due to the error is caused in some cases depending on the contents of the process. Accordingly, in the exemplary embodiment, when the one-touch selection button 21 is created, the controller 100 switches between the creation of the one-touch selection button 21 for the direct start and the creation of the one-touch selection button 21 for the non-direct start in accordance with the contents of the process associated with the one-touch selection button 21 to be created.

Specifically, conditions such as parameters, which correspond to the contents of the process considered to have a serious effect if inadvertently executed, are set in advance and integrated into a control program, or stored in the memory 105 or the like. Then, when the one-touch selection button 21 is created, the controller 100 checks the contents of the process associated with the one-touch selection button 21 (the contents of detailed settings or the kind of process or the like received in step 102 and stored in step 103) against the above-described preset conditions (the conditions set in advance corresponding to the contents of the process considered to have a serious effect).

As a result of the checking, in a case where the contents of the process associated with the one-touch selection button 21 satisfy the preset conditions, the associated process is a process causing a serious effect by inadvertent execution. In this case, the process associated with the one-touch selection button 21 should not be directly and inadvertently started by selection of the one-touch selection button 21, and accordingly, the confirmation screen is displayed prior to starting the process to require operation by the user for starting the process. Consequently, in this case, the controller 100 determines that the process cannot be directly executed without displaying the confirmation screen (NO in step 105). Then, by the control of the controller 100, the creation screen that prohibits creation of the one-touch selection button 21 for the direct start and provides permission to create only the one-touch selection button 21 for the non-direct start is displayed in the display part 107 (step 112).

On the other hand, in a case where the contents of the process associated with the one-touch selection button 21 do not satisfy the preset conditions, the associated process is not a process causing a serious effect by inadvertent execution. In this case, the process associated with the one-touch selection button 21 may be directly started by selection of the one-touch selection button 21. Accordingly, in this case, the controller 100 determines that the process can be executed without confirmation (YES in step 105). Then, in the display part 107, the creation screen that provides permission to create the one-touch selection button 21 for the direct start is displayed by the control of the controller 100 (step 106).

It should be noted that the preset conditions checked against the contents of the process in step 105 are stipulated by at least one of, for example, the kind of process ("copy", "box storage", "ID card copy", "access to medium", "mail", "print", "PC storage" (or "box storage"), "fax" or the like), a parameter regarding the output of the process (whether or not an output destination is outside of a company, the number of recording sheets consumed by outputs, or the number of outputs) and an amount of resources used for processing except for the processing apparatus (a memory capacity consumed by box storage, a state where an automatic execution process, such as automatic transfer of data stored in the box, is set, a memory capacity used in accordance with reading resolution by an automatic execution scanner, or the like).

More specifically, for example, a kind of process "fax" is set as the above-described conditions. Accordingly, in the case where the process associated with the one-touch selection button 21 is "fax", the controller 100 makes determination of NO in step 105, and displays the screen for creating the one-touch selection button for the non-direct start (step 112). Similarly, for example, a case in which the kind of process is "mail" and the transmission destination as the parameter regarding the output of the process is outside of the company is set as the above-described conditions. Consequently, in the case where the process associated with the one-touch selection button 21 is "mail" and the transmission destination is outside of the company, the controller 100 makes determination of NO in step 105, and displays the screen for creating the one-touch selection button for the non-direct start (step 112).

Moreover, for example, a case in which the kind of process is "copy" and the number of outputs as the parameter regarding the output of the process is "not less than 10" is also set as the above-described conditions. Accordingly, in the case where the process associated with the one-touch selection button 21 is "copy" and the number of outputs is "not less than 10", the controller 100 makes determination of NO in step 105, and displays the screen for creating the one-touch selection button for the non-direct start (step 112).

Moreover, for example, a case in which the kind of process is "box storage" and the amount of resources used for processing is "a state where an automatic execution process, such as automatic transfer of data to others, is set in a box that stores the data" is also set as the above-described conditions. Accordingly, in the case where the process associated with the one-touch selection button 21 is "box storage" and the amount of resources used for processing satisfies the preset conditions, the controller 100 makes determination of NO in step 105, and displays the screen for creating the one-touch selection button for the non-direct start (step 112).

The conditions provided here are merely examples, and conditions are not limited to those described above. That is, as long as conditions correspond to processes assumed to have serious effects when the one-touch selection button 21 is erroneously selected and thereby the processes associated therewith are inadvertently executed, those other than the above-described examples are able to be set as preset conditions.

The preset conditions may be fixed or changed. In the case of allowing the conditions to be changed, for example, the setting may be carried out according to instructions by a person having authority to control the image forming apparatus 10. In other words, the person having the authority to control the image forming apparatus 10 carries out operations on the image forming apparatus 10 permitted by the control, to thereby provide instructions to the controller 100 to rewrite the conditions. Upon receiving the instructions, the controller 100 reads the conditions stored in the memory 105 and displays the read conditions on the display part 107.

The person having the authority of control carries out an operation to rewrite the conditions displayed on the display part 107 on the display screen, and inputs an instruction to update to the rewritten conditions onto the display part 107. In accordance with the instruction to update inputted onto the display part 107, the controller 100 causes the memory 105 to store the rewritten conditions inputted to the display part 107. Thereafter, the controller 100 uses the rewritten conditions in checking in step 105.

In this manner, in the case where the one-touch selection button 21 to be created is switched in accordance with contents of a process between the one-touch selection button 21 for the direct start (step 106) and the one-touch selection button 21 for the non-direct start (step 112), it is possible to set the conditions corresponding to the contents of the process according to instructions from a person having a preset authority (for example, an administrator of a processing apparatus).

The creation screen that provides permission to create the one-touch selection button 21 for the direct start (step 106), which is displayed on the display part 107 by the control of the controller 100, is as shown in FIG. 12, for example.

Subsequently, the controller 100 receives changes in setting contents regarding the one-touch selection button 21 to be newly created, which have been inputted by a user on the creation screen shown in FIG. 12 (step 107). Though the setting contents regarding the one-touch selection button 21 will be described later, in the creation screen that provides permission to create the one-touch selection button 21 for the direct start, as one of the setting contents regarding the one-touch selection button 21, there is provided a direct start button 34 to set distinction of the one-touch selection button 21 between the one-touch selection button 21 for the direct start and the one-touch selection button 21 for displaying the confirmation screen.

The direct start button 34 in the creation screen that provides permission to create the one-touch selection button 21 for the direct start (step 106) is capable of making selection operation between "YES" and "NO" regarding the direct start. That is, the direct start button 34 is made active, and a user is able to select whether "YES" to make the one-touch selection button 21 for the direct start or "NO" to not make the one-touch selection button 21 for the direct start (to display the confirmation screen) by sliding a knob on the direct start button 34 to the right or left.

It should be noted that, the direct start button 34 controlled by the controller 100 so that, when the direct start button 34 is active, displayed in a color different from the color of "background" in the creation screen in FIG. 12. In this manner, by displaying the direct start button 34 in the color different from the color of "background", it is possible to make a user recognize that the direct start button 34 is active at a glance.

Then, in the case where the user sets the direct start button 34 to "YES", the controller 100 determines the user's instruction as the direct start (YES in step 108) and decides to create "one-touch selection button 21 for direct start" (step 109). On the other hand, in the case where the user sets the direct start button 34 to "NO", the controller 100 determines the user's instruction as the non-direct start (NO in step 108) and decides to create "one-touch selection button 21 for displaying confirmation screen" (step 114).

It should be noted that, in FIG. 12, since the knob on the direct start button 34 slides to the left, the display of "YES" appears and the display of "NO" is hidden to be out of view; however, if the knob on the direct start button 34 slides to the right, similar to FIG. 9B, the display of "YES" is hidden to be out of view, whereas, the display of "NO" comes to the visible state. The display in the visible state becomes the instruction selected by the user.

In a similar way, the creation screen for creating only the one-touch selection button 21 (step 112) displayed on the display part 107 by the control of the controller 100 is, for example, as shown in FIG. 12. The controller 100 receives the changes in the setting contents regarding the one-touch selection button 21 to be newly created, which have been inputted by the user in this creation screen (step 113). However, in the creation screen for creating only the one-touch selection button 21 (step 112), the above-described direct start button 34 is locked to "NO" regarding the direct start, and accordingly, it is impossible to receive the selection operation by the user. In other words, the direct start button 34 is inactive to disable the selection by the user, and thereby it is decided that "one-touch selection button 21 for displaying confirmation screen" is created (step 114).

It should be noted that, in the inactive state, the direct start button 34 is controlled by the controller 100 to be displayed in a color same as the "background" color of the creation screen in FIG. 12. By displaying the direct start button 34 in the same color as the "background" color in this manner, it is possible to make a user recognize that the direct start button 34 is inactive at a glance.

Next, the controller 100 determines whether or not a creation completion button 38 that is displayed in each creation screen for completing creation of the one-touch selection button 21 has been selected by the user (step 110). It should be noted that, in the case where the creation completion button 38 has not been selected (NO in step 110), the controller 100 waits until the creation completion button 38 is selected. If it is determined that the creation completion button 38 is pressed (YES in step 110), the controller 100 causes the memory 105 to store the information and determination which are inputted and received in steps 101, 107, 109, 113 and 114 as information associated with the one-touch selection button 21 to be created (step 111).

With the above description, creation of the one-touch selection button 21 by the controller 100 is completed.

It should be noted that, in step 110, in the case where the controller 100 determines that the creation completion button 38 is pressed, the controller 100 switches the display screen on the display part 107 to the home screen for the user. Then, the one-touch selection button 21 created by the above-described steps is displayed on the home screen, for example, as shown in FIG. 13 by the control of the controller 100.

Subsequently, details of the creation screen of the one-touch selection button will be described.

In the creation screen of the one-touch selection button, by the control of the controller 100, buttons or boxes for allowing a user to input information required by the user to create the one-touch selection button 21 are displayed. The creation screen of the one-touch selection button shown in FIG. 12 includes: a name box (a first line 31A and a second line 31B); an icon change button 32 (corresponding to the button 9B in FIG. 9B); a destination display selection button 33; and the direct start button 34.

The name box 31 is a box where a name of the one-touch selection button 21 to be created is inputted. The icon change button 32 is a button for changing a design (icon) of the one-touch selection button 21 to be created. The destination display selection button 33 is a button for selecting whether or not a destination is displayed in the icon of the one-touch selection button 21 to be created. The direct start button 34 is a slide-type button for switching the one-touch selection button 21 to be created by the user between the one-touch selection button 21 for the direct start and the selection button 21 for displaying the confirmation screen.

Further, the creation screen of the one-touch selection button includes: a kind display part 35; an explanation box 36; a preview display part 37 and the creation completion button 38.

The kind display part 35 is a part where a kind of a function of a process associated with the one-touch selection button 21 to be created is displayed. The explanation box 36 is a box for inputting explanations regarding the one-touch selection button 21 to be created. The preview display part 37 displays a state of the one-touch selection button 21 to be created when the button 21 is displayed on the home screen. The creation completion button 38 is a button for inputting instructions to complete creation of the one-touch selection button 21.

Here, as described above, the name box 31 is a box for inputting a name to be displayed on the display screen (the home screen) together with the icon of the one-touch selection button 21, and is divided into two lines, namely, the first line 31A and the second line 31B. In the exemplary embodiment, in a default state that is initially displayed on the display part 107 when a user selects the creation start button 9A in step 102, a name related to the function inputted in step 101 is entered in the name box 31 in advance by the control of the controller 100. In this specific example, corresponding to the fax function inputted in step 101, "one-touch" is inputted in the first line 31A, and "fax transmission" is inputted in the second line 31B of the name box 31.

In the exemplary embodiment, a user is able to change the name inputted in the name box 31. Specifically, when the user presses the name box 31 (the first line 31A and the second line 31B), a keyboard screen (not shown) is displayed on the display part 107 by the controller 100. The user is able to input an arbitrary name to the name box 31 by use of the displayed keyboard.

The icon change button 32 is a button selected by a user when the icon of the one-touch selection button 21 to be created is changed. Moreover, on the left side in the figure of the icon change button 32, an icon that is presently set is displayed. In the exemplary embodiment, in the default state initially displayed on the display part 107, a design predetermined by the controller 100 is set, and is displayed on the left side in the figure of the icon change button 32.

When the icon change button 32 is selected by the user, an icon selection screen in which plural designs are arranged (refer to FIG. 10) is displayed on the display part 107 by the controller 100. Then, by selecting a design from the icon selection screen, the user is able to change the design of the one-touch selection button 21 to be created. FIG. 12 shows a state in which the icon is changed to the icon for fax.

The destination display selection button 33 is a slide-type button having a knob that is movable to the right or left, and the user is able to select distinction between "YES" and "NO" by sliding the knob to the right or left. It should be noted that the destination display selection button 33 is displayed in the case where, for example, the function selected in step 101 includes a function of transferring data (facsimile transmission or mail transmission) to the outside of the image forming apparatus 10 (refer to FIG. 1).

Though details will be described later, in the case where the user select "YES" on the destination display selection button 33, information regarding the destination of the function associated with the one-touch selection button 21 is displayed together with the icon of the one-touch selection button 21 displayed on the home screen by the control of the controller 100. It should be noted that, in the exemplary embodiment, in the default state of the creation screen initially displayed on the display part 107, the destination display selection button 33 is set as "YES". Consequently, in the case where the user does not operate the destination display selection button 33, the destination is displayed together with the icon of the selection button 21.

As a result, as long as the user does not carry out an operation of changing the destination display selection button 33 to the setting of "NO" in the creation screen of one-touch selection button, the destination is set to be notified to the user. Accordingly, it is possible to suppress occurrence of erroneous transmission, such as transmitting data to an unintended destination, compared to the case where the destination display selection button 33 is set as "NO" in the creation screen in the default state. It should be noted that, in the specific example shown in FIG. 12, the destination display selection button 33 is selected as "YES".

Similar to the destination display selection button 33, the direct start button 34 is configured with a slide-type button. In the creation screen of one-touch selection button displayed when creation of the one-touch selection button 21 for the direct start is permitted (step 106 in FIG. 11), the direct start button 34 is set to be active. Accordingly, by sliding the knob on the button to the right or left, the user is able to select "YES" or "NO" (to display the confirmation screen) for the direct start.

Figure 13:
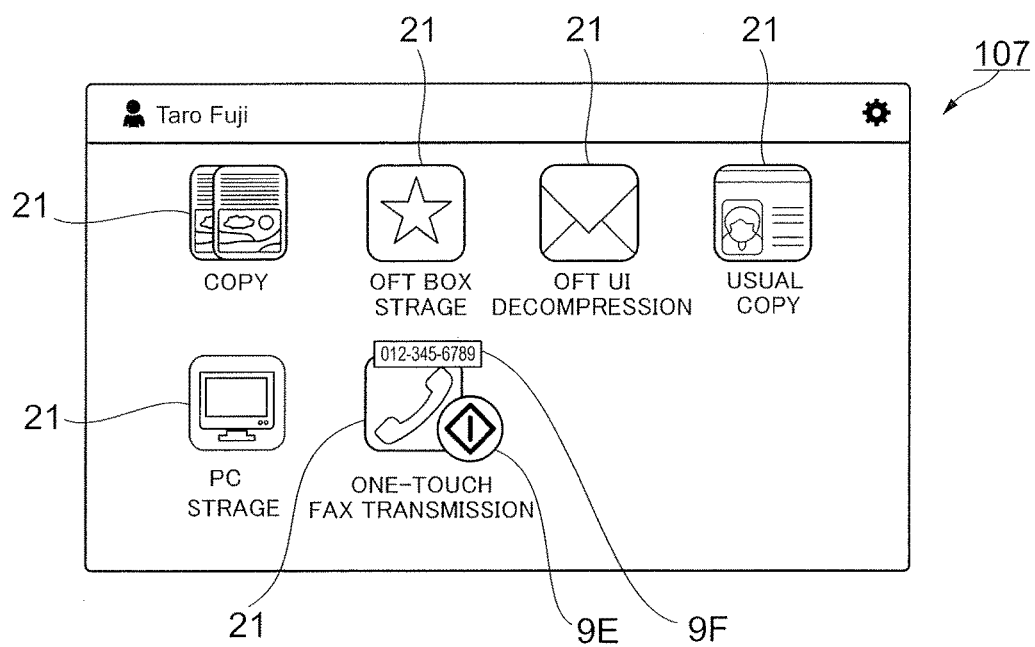
FIG. 13 is a diagram showing the home screen in which the one-touch selection button having been created is displayed.

In the case where the user selects "YES" on the direct start button 34, the one-touch selection button 21 for the direct start is created, and the icon of the one-touch selection button 21 for the direct start displayed on the home screen is provided with the rhombus-shaped mark 9E (refer to FIG. 13). On the other hand, in the case where the user selects "NO" on the direct start button 34, the one-touch selection button 21 for displaying the confirmation screen is created. In this case, the icon displayed on the home screen is not provided with the rhombus-shaped mark 9E.

In the case where the one-touch selection button 21 for displaying the confirmation screen is selected on the home screen by the user, prior to starting the process associated with the one-touch selection button 21 for displaying the confirmation screen, a confirmation screen for confirming the setting contents or the like of the process associated with the one-touch selection button 21 for displaying the confirmation screen is displayed on the display part 107. Then, upon receiving the provision of the confirmation screen, when the user is consent to start the process, the user presses the start button provided in the image forming apparatus 10, to thereby start the process associated with the one-touch selection button 21.

On the other hand, if the user wants to cancel the process after receiving the provision of the confirmation screen, the user presses a cancel button provided in the image forming apparatus 10, and thereby the process associated with the one-touch selection button 21 is not executed and the display part 107 returns to the home screen.

In the exemplary embodiment, in the creation screen of the one-touch selection button in the default state initially displayed in the display part 107 (refer to FIG. 12), the direct start button 34 is set as "NO". Consequently, if the user does not carry out an operation of changing the direct start button 34 to "YES", the one-touch selection button 21 to be created becomes "one-touch selection button 21 for displaying confirmation screen".

As a result, the setting is made so that, as long as the user does not carry out an operation of changing the direct start button 34 to the setting of "YES" in the creation screen, the one-touch selection button 21 to be created does not become the one-touch selection button 21 for the direct start. Consequently, it is possible to suppress unintentional creation of the one-touch selection button 21 for the direct start, compared to the case where the direct start button 34 is set as "YES" in the default state. Then, it is possible to suppress unintentional execution of the process associated with the one-touch selection button 21 for the direct start caused by erroneous selection of the one-touch selection button 21 for the direct start by the user.

It should be noted that, in the specific example shown in FIG. 12, the direct start button 34 is set as "YES" by the user's selection.

On the other hand, in the creation screen of the one-touch selection button displayed when creation of only the one-touch selection button 21 for displaying the confirmation screen is permitted (step 112 in FIG. 11), the direct start button 34 is locked to "NO", to be thereby set as inactive. Consequently, the user is not able to slide the knob on the button to the right or left, and thereby it is impossible to select "YES" on the direct start.

The kind display part 35 displays a kind of the function associated with the one-touch selection button 21 to be created. The contents displayed in the kind display part 35 are set by the controller 100 in accordance with the function selected in step 101, and are incapable of being changed by a user.

As described above, since it is possible for a user to change the icon or name of the one-touch selection button 21 to be created, there are some cases in which the icon or name of the one-touch selection button 21 is changed by a user to those irrelevant to the selected function. In this case, by watching icons or names irrelevant to the function in selecting the function, there is a possibility that a user has a false perception regarding the function associated with the one-touch selection button 21.

Consequently, in the exemplary embodiment, the kind of the function associated with the one-touch selection button 21 is displayed in the kind display part 35 for suppressing occurrence of such inconveniences. In the specific example shown in FIG. 12, the characters "fax transmission" corresponding to the fax function selected in step 101 and "(transmission destination: 1) corresponding to the number of transmission destinations set in step 102 are displayed in the kind display part 35 by the controller 100.

The explanation box 36 is a box for inputting explanations regarding the one-touch selection button 21 to be created. A user is able to input arbitrary explanations to the explanation box 36. Specifically, when a user presses the explanation box 36, a keyboard screen (not shown) is displayed on the display part 107 by the controller 100.

The user is able to input explanations by use of the keyboard. Then, the controller 100 displays the explanations in the explanation box 36, input of which has been received via the keyboard. Moreover, in the exemplary embodiment, there are some cases in which explanations are automatically inputted in the explanation box 36 to be displayed by the controller 100 corresponding to, for example, the function selected in step 101 or the item set in the step 102. In this specific example, a phone number set as a transmission destination of fax in step 101 is automatically inputted and displayed in the explanation box 36 by the controller 100.

The preview display part 37 is a part displaying how the one-touch selection button 21 to be created is displayed on the home screen as a preview. Specifically, in the preview display part 37, a name inputted to the name box 31 or inputted by default and an icon selected by the icon change button 32 or selected by default are displayed by the controller 100.

Moreover, in the case where "YES" is selected on the destination display selection button 33, on each of the home screen shown in FIG. 13 and the preview display part 37, information regarding the destination of the selected function (a destination display 9F) is displayed to overlap an upper portion of the icon. Further, in the case where "YES" is selected on the direct start button 34, on each of the home screen shown in FIG. 13 and the preview display part 37, the rhombus-shaped mark 9E is displayed to overlap the down right of the icon.

Here, in the case where the information set in the name box 31, the icon change button 32, the destination display selection button 33 or the direct start button 34 is changed, the controller 100 of the exemplary embodiment reflects the changed contents in the preview displayed in the preview display part 37 in real time. Accordingly, it becomes possible for a user who creates the selection button 21 to confirm present settings, and thereby, for example, setting of an unintended icon or name in the one-touch selection button 21 to be created can be suppressed.

As described above, the creation completion button 38 is a button for completing creation of the one-touch selection button 21. In the case where the creation completion button 38 is selected by a user (step 110 in FIG. 11), the controller 100 causes the memory 105 to store the selected function or setting items (step 111 in FIG. 11).

According to the image forming apparatus 10 and the control program of the exemplary embodiment configured as described above, the controller 100 switches between the one-touch selection button 21 for displaying confirmation screen and the one-touch selection button 21 for the direct start to be created. In the state of being displayed on the home screen in the display part 107, if the one-touch selection button 21 for displaying confirmation screen is selected by a user, the controller 100 displays the confirmation screen that presents at least part of the items set by the user on the screen for detailed settings in a stage prior to moving the creation screen of one-touch selection button or the creation screen of one-touch selection button and stored in the memory 105 on the display part 107. Then, after confirming the contents displayed on the confirmation screen (though it is not required to confirm in actuality), the user presses the star button, to thereby execute the process associated with the one-touch selection button 21.

On the other hand, in the state of being displayed on the home screen in the display part 107, if the one-touch selection button 21 for the direct start is selected by a user, the controller 100 controls each functional part to execute the process associated with the one-touch selection button 21 for the direct start, to thereby execute the process. At this time, after selecting the one-touch selection button 21, the user does not carry out any operation until the process is executed.

Consequently, according to the exemplary embodiment, compared to the case where only one kind of operation can be selected when instructions for a process are received, it is possible to create the one-touch selection button from the two kinds for execution operation of a process according to user's intention. Moreover, convenience of the user is improved by providing difference in operations required to the user when the one-touch selection button 21 is selected.

Accordingly, since the process of, for example, making only one or two copies does not have a serious effect even though the process is executed in error, it is unnecessary to display the confirmation screen to require a user to press the start button anew, and therefore, it is possible to save the user the trouble of operating by causing a process to be executed only by selection by the user as the process associated with the one-touch selection button 21 for the direct start.

On the other hand, in the process of fax transmission, there are quite a lot of cases where a serious effect is caused by execution in error; and accordingly, the confirmation screen is displayed and the user is required to press the start button anew.

In this manner, according to the exemplary embodiment, it is possible to create the one-touch selection button 21 from the two kinds for execution operation of a process according to user's intention compared to the case where only one kind of operation can be selected when instructions for a process are received. Moreover, convenience of the user is improved by providing difference in operations required to the user when the one-touch selection button 21 is selected.

Moreover, according to the exemplary embodiment, compared to the case where creation of the one-touch selection button 21 for the direct start is permitted for all the processes, it is possible to suppress erroneous execution for part of the processes. In this case, for example, since the one-touch selection button 21 is able to be switched between that for the direct start and that for displaying the confirmation screen in accordance with the contents of the process associated with the one-touch selection button 21 (step 105 in FIG. 11), it is possible to prevent a process from being inadvertently executed by prohibiting creation of the one-touch selection button 21 for the direct start regarding, for example, the process having a serious effect in erroneous execution. Moreover, by permitting creation of the one-touch selection button 21 for displaying confirmation screen for the part of the processes, it is possible to execute the part of the processes with ease compared to the case where creation of the one-touch selection button 21 for displaying confirmation screen is prohibited.

Further, according to the exemplary embodiment, in the case where creation of the one-touch selection button 21 for the direct start is permitted because the contents of the process associated with the one-touch selection button 21 do not satisfy the conditions (step 106 in FIG. 11), the one-touch selection button 21 is created by carrying out switching between the one-touch selection button 21 for the direct start and the one-touch selection button 21 for displaying confirmation screen in accordance with selection instruction for the direct start button 34 by a user (steps 108, 109 and 114 in FIG. 11).

Consequently, it is possible to some extent to create the one-touch selection button 21 by switching between the one-touch selection button 21 for the direct start and the one-touch selection button 21 for displaying confirmation screen also by user's selection.

It should be noted that switching of whether the one-touch selection button 21 for the direct start is created or the one-touch selection button 21 for displaying confirmation screen is created may simply be determined in accordance with user's selection instruction only, not in accordance with the contents of the process associated with the one-touch selection button 21 to be created. In this case, in the above-described exemplary embodiment, the processes in steps 105, 112 and 113 in FIG. 11 by the controller 100 may be omitted.

On the other hand, switching of whether the one-touch selection button 21 for the direct start is created or the one-touch selection button 21 for displaying confirmation screen is created may be determined in accordance with only the contents of the process associated with the one-touch selection button 21 to be created. In this case, in the above-described exemplary embodiment, the processes in step 108 in FIG. 11 by the controller 100 may be omitted.

Moreover, according to the exemplary embodiment, it is possible to provide the process having a serious effect when being inadvertently executed with the conditions stipulated by at least one of the parameter regarding the output of the process and the state of resources used in output of the process. Then, in the case where the process associated with the one-touch selection button 21 to be created satisfies the conditions, it is possible to prevent increase of the effect caused by inadvertent execution since the one-touch button 21 for displaying confirmation screen is created.

The exemplary embodiment is an example of creating a one-touch selection button 21 in which the contents of the process related to the fax function are registered; however, in the case where the one-touch selection button 21 that registers contents of a process related to a function other than the fax function is created, a configuration and processes are similar to those described in the exemplary embodiment.

By the way, in the exemplary embodiment, there are some cases in which, by changing of various settings of the image forming apparatus 10 in the exemplary embodiment after creation of the one-touch selection button 21 for the direct start, execution of the process associated with the one-touch selection button 21 is affected.

Description will be given of a case in which, for example, a process of box storage (a box storage function) is associated with the one-touch selection button 21 for the direct start. In the exemplary embodiment, in the case where the box storage function is associated with the one-touch selection button 21, it is possible to further associate the transfer function, such as a fax or mail, as the items of detailed settings with the one-touch selection button 21 (step 102 in FIG. 11) as an attribute of the box storage (hereinafter, referred to as a box attribute).

Accordingly, in the case where the transfer function as the box attribute is associated with the one-touch selection button 21, with which the box storage function has been associated, by selecting the one-touch selection button 21 to store data in the associated box, the data stored in the box is automatically transferred to the outside of the image forming apparatus 10 by the transfer function, such as the fax or mail, associated with the one-touch selection button 21.

Consequently, when the one-touch selection button 21, with which the box storage function is associated, is to be created, the controller 100 switches the one-touch selection button 21 to be created between the one-touch selection button 21 for the direct start and the one-touch selection button 21 for displaying the confirmation screen according to whether or not the transfer function, such as the fax or mail, is included in the contents of the associated process.

Specifically, in step 105 in FIG. 11, if there is the transfer function, such as the fax or mail, as the items of detailed settings associated with the one-touch selection button 21 to be created (steps 102 and 103), for preventing inadvertent execution due to erroneous selection, the controller 100 determines that the process is incapable of being executed without confirmation (NO in step 105), and displays the creation screen of the one-touch selection button 21 for displaying the confirmation screen (step 112).

On the other hand, in step 105, if there is no transfer function, such as the fax or mail, as the items of detailed settings associated with the one-touch selection button 21 to be created (steps 102 and 103), since an effect caused by inadvertent execution due to erroneous selection is not so serious, the controller 100 determines that the process is capable of being executed without confirmation (YES in step 105), and displays the creation screen that permits creation of the one-touch selection button 21 for the direct start (step 106). In this case, if a user operates the direct start button 34 in the creation screen for the one-touch selection button and selects "YES" regarding the direct start (step 108 to step 109), the controller 100 creates the one-touch selection button 21 for the direct start.

Incidentally, in the exemplary embodiment, it is possible to directly associate the box attribute with each box in which the data is stored by the box storage function. Accordingly, the box attribute of the transfer function, such as the fax or mail, can be directly assigned to the box that becomes an object of the box storage function associated with the one-touch selection button 21 for the direct start having already been created.

Consequently, if the one-touch selection button 21 for the direct start, with which the box storage function having a box provided with the box attribute of the transfer function, such as the fax or mail, later in this manner as an object, is inadvertently executed by erroneous selection, the data is stored in the object box in accordance with the contents of the associated process; however, the data stored in the box is automatically transferred to the outside of the image forming apparatus 10 by the box attribute assigned later.

In the exemplary embodiment, when the created one-touch selection button 21 for the direct start is selected, prior to starting the process associated with the one-touch selection button 21, the controller 100 confirms whether or not any change is added to the setting items stipulating the contents of the process and in accordance with the contents of the change, controls not to execute the direct start.

Specifically, as shown in FIG. 14, when the created one-touch selection button 21 is selected, the controller 100 determines whether or not the selected one-touch selection button 21 is "one-touch selection button for displaying confirmation screen" (step 201). When the selected one-touch selection button 21 is determined as "one-touch selection button for displaying confirmation screen" (YES in step 201), the controller 100 controls the display part 107 to display the confirmation screen (step 205), and after the start button is pressed by a user, the controller 100 controls so that the process associated with the one-touch selection button 21 is executed (step 204).

On the other hand, when the selected one-touch selection button 21 is not determined as "one-touch selection button for displaying confirmation screen" (in other words, determined as the one-touch selection button 21 for the direct start) (NO in step 201), the controller 100 determines whether or not any change is added to the setting items stipulating the contents of the process associated with the one-touch selection button 21 (step 202). When it is determined that any change is not added (NO in step 202), the controller 100 controls to execute the process associated with the one-touch selection button 21 (step 204).

Moreover, when it is determined that some change is added to the setting items stipulating the contents of the process associated with the one-touch selection button 21 (YES in step 202), the controller 100 determined whether or not the process can be executed without confirmation due to the change (step 203). The "determination whether or not the process can be executed without confirmation" is the same process as the determination by the controller 100 whether or not the contents of the process stored in the memory 105 satisfy the preset conditions (step 105 in FIG. 11) when the one-touch selection button 21 is to be created.

When it is determined that the process associated with the one-touch selection button 21 can be executed without confirmation irrespective of the change (YES in step 203), the controller 100 controls to execute the process associated with the one-touch selection button 21 (step 204). For example, in the case of the one-touch selection button 21 for the direct start, with which the process of the box storage is associated, if change to increase the capacity of the box capable of storing, which is an object of the box storage process, is added after creation of the one-touch selection button 21, the change does not become a condition that interferes with execution of the process without confirmation. Accordingly, in the case of this specific example, the process associated with the one-touch selection button 21 for the direct start is executed without displaying the confirmation screen, or without waiting for a pressing operation of the start button by a user (step 204).

On the other hand, when it is determined that the process associated with the one-touch selection button 21 cannot be executed without confirmation due to the change (NO in step 203), the controller 100 controls so that the confirmation screen is displayed on the display part 107 despite that the one-touch selection button 21 is for the direct start (step 205), and also controls so that the process associated with the one-touch selection button 21 is executed after the start button is pressed by the user (step 204). For example, in the case of the one-touch selection button 21 for the direct start, with which the process of the box storage is associated, if change to reduce the capacity of the box capable of storing, which is an object of the box storage process, or change to provide the transfer function, such as the fax or mail, that has not been added at the time of creation of the button as described above, is added after creation of the one-touch selection button 21, the change becomes a condition that interferes with execution of the process without confirmation. Accordingly, in the case of this specific example, the process associated with the one-touch selection button 21 for the direct start is not directly executed, but the confirmation screen is displayed (step 205) and the pressing operation of the start button by the user is carried out, and thereafter, the process is executed (step 204).

In this manner, according to the exemplary embodiment, even though the one-touch selection button 21 for the direct start is created, at the time of executing a process associated with the one-touch button 21 for the direct start, if the process is changed to cause a serious effect in the case of being erroneously executed, it is possible to prevent the process from being inadvertently executed.

Second Exemplary Embodiment

Next, a second exemplary embodiment will be described by using FIG. 15.

Figure 15A:
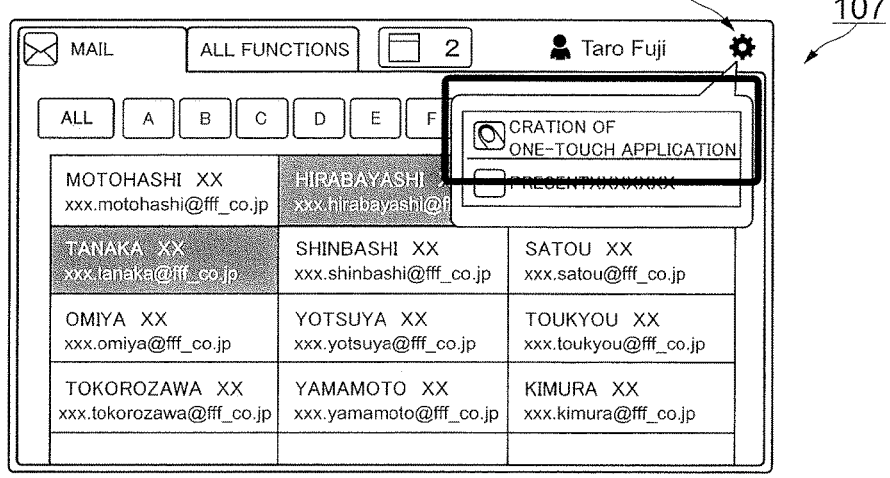
FIGS. 15A to 15C are diagrams showing examples of the display screen when a user creates a one-touch selection button in a second exemplary embodiment.
Figure 15B:
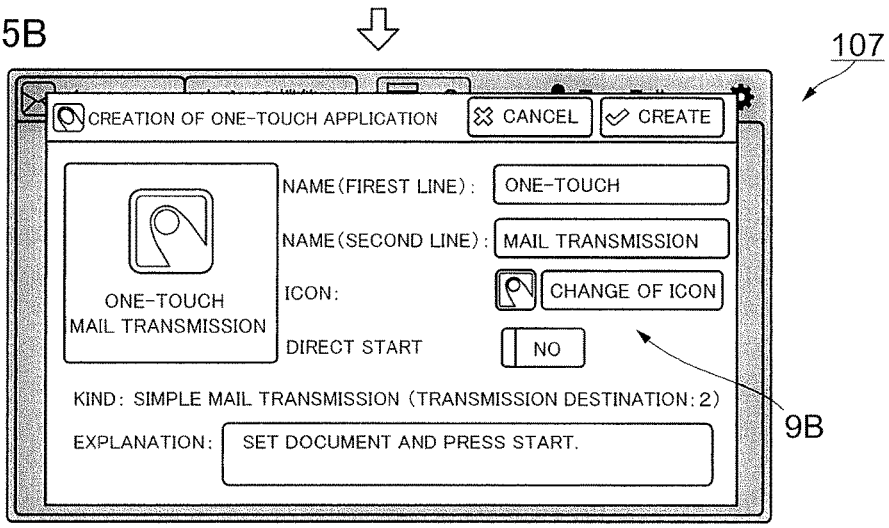
Figure 15C:
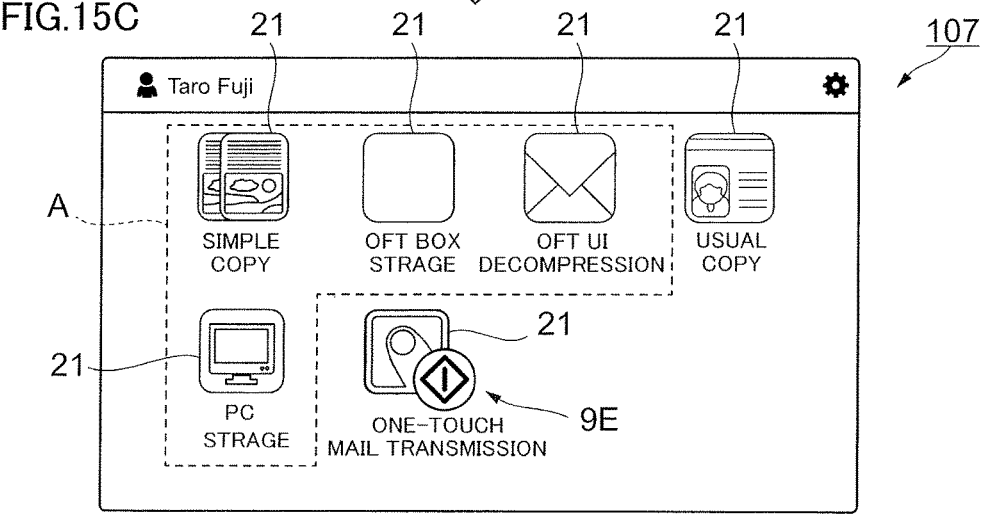

Though similar description has been given in FIGS. 9A to 9C, in FIGS. 15A to 15C, in the screen for confirmation displayed by selection of the one-touch selection button 21 for displaying confirmation screen, it is possible for a user to select not only inputting a start of a process, but also inputting a cancellation of a process. If the inputting of a cancellation is carried out, a process associated with the selected on-touch selection button 21 is not executed. It should be noted that, in the exemplary embodiment, other selection buttons 21 including the one-touch selection button 21 for displaying the confirmation screen, except for the one-touch selection button 21 for the direct start, are examples of the first process receiving portion.

When a user creates the one-touch selection button 21, in FIG. 15A (here, FIGS. 15A to 15C are diagrams showing display screens in creation of the one-touch selection button 21 by a user), a gear-shaped mark (a mark indicated by the reference sign 9A) positioned at the top right of the figure is pressed by the user. It should be noted that the display screen shown in FIG. 15A is a screen when a mail is transmitted. In other words, FIG. 15A shows a state after the selection button 21 for "mail" shown in FIG. 2 is selected by a user and the display screen is switched.

When the gear-shaped mark 9A is pressed by the user, the display screen shown in FIG. 15B is displayed. In this display screen, information required to create the one-touch selection button 21 (parameters or the like) is inputted by the user. Specifically, as a name of the one-touch selection button 21, "name (the first line)" and "name (the second line)" are inputted by the user.

The name of the one-touch selection button 21 (the created one-touch selection button 21) in the exemplary embodiment is represented by a name of two lines. "Name (first line)" shows a name displayed in an upper line of the two lines, whereas, "name (second line)" shows a name displayed in a lower line of the two lines.

Further, in the display screen shown in FIG. 15B, a design to become an icon for displaying the one-touch selection button 21 is also displayed. The design can be changed by pressing a button 9B, with which a process of changing the design is associated, by the user. That is, when the button 9B is pressed by the user, a screen shown in FIG. 10 (a screen showing a list of designs of the one-touch selection button 21) is displayed. The user select a design as the one-touch selection button 21 from the list of the designs shown in the screen, and accordingly, the selected design for the one-touch selection button 21 is registered as an icon.

Further, in the display screen shown in FIG. 15B, there is a slide button about the direct start to set whether the one-touch selection button 21 is the one-touch selection button 21 for the direct start or the one-touch selection button 21 for displaying the confirmation screen; however, this will be described later. It should be noted that, the display screen shown in FIG. 15B is set to create the one-touch selection button 21 for the direct start.

Moreover, in the exemplary embodiment, a user is able to register explanations, and a user who wants to register explanations inputs the explanations within a box positioned at a lower portion of the display screen (the display screen shown in FIG. 15B).

Here, when input by the user to the display screen shown in FIG. 15B is completed, a button called "creation" positioned at top right of the figure is pressed by the user. Consequently, by the control of the controller 100, a display is switched to a display screen shown in FIG. 15C, and a one-touch selection button 21 named "one-touch mail transmission" is added to the display screen (the home screen). Here, the process of creating the one-touch selection button 21 for the direct start has been described; however, in the exemplary embodiment, a one-touch selection button 21 for displaying the confirmation screen can also be created by operation of a slide button of the direct start by the user.

After the one-touch selection button 21 for displaying the confirmation screen receives instructions on a process by being selected by the user, the confirmation screen for receiving further instructions is displayed, and then, after waiting for inputting (providing instruction) of a start button by the user, a process associated with the one-touch selection button 21 is executed. In the exemplary embodiment, a start button for starting a process after displaying a confirmation screen by selecting the one-touch selection button 21 for displaying the confirmation screen is not displayed on the display screen, but is arranged as a button of hardware (not shown) in any other location of the image forming apparatus 10.

Moreover, the one-touch selection button 21 for the direct start is, when displayed on the home screen, distinguishable from selection buttons other than the one-touch selection button 21 for the direct start (the one-touch selection button 21 for displaying the confirmation screen or ordinary selection buttons 21). That is to say, to the design of the one-touch selection button 21 for the direct start displayed on the home screen, for example, a rhombus-shaped mark 9E shown in FIG. 15C is added. It should be noted that, in the exemplary embodiment, description has been given to the display process in the image forming apparatus 10; however, the display process is able to be executed in a similar way in apparatuses other than the image forming apparatus 10 (for example, an apparatus such as a tablet).

Figure 16:
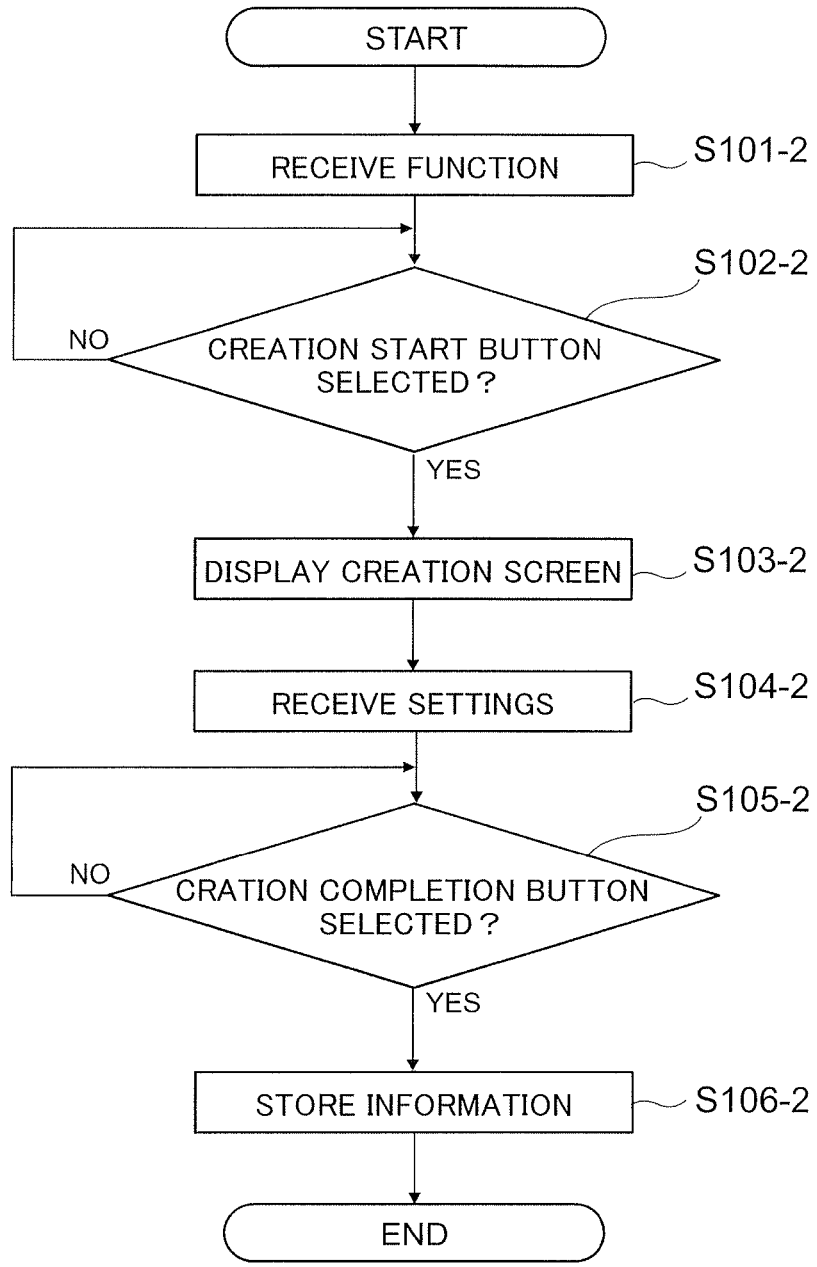
FIG. 16 is a flowchart showing an example of a process executed by a controller when the one-touch selection button is created.

Subsequently, the process of creating the one-touch selection button 21 will be described in more detail. FIG. 16 is a flowchart showing a process executed by the controller 100 (refer to FIG. 1) when the one-touch selection button 21 is created. FIG. 12 is a diagram showing a display screen displayed on the display part 107 when the one-touch selection button 21 is created. In this specific example, description will be given by taking a case of creating a selection button 21 related to a fax transmission function as an example.

As shown in FIG. 16, when a selection button 21 is to be newly created, the controller 100 receives an input about a function (a process) to be associated with the selection button 21 to be newly created from a user (step 101-2). Specifically, when the selection button 21 is newly created, the user selects (presses) a selection button 21 representing the function to be associated with the selection button 21 to be newly created on the home screen shown in the above-described FIG. 2. In this specific example, the user first selects a selection button for "fax" on the home screen for the user shown in FIG. 2.

If the selection button 21 is pressed by the user on the home screen, the screen for performing settings by the user about the function associated with the selected selection button 21, which is shown in FIGS. 3 to 6A and 6B, is displayed in the display part 107 by the controller 100. In the specific example, also in the case where the selection button 21 for "fax" is selected, the screen for performing settings about the fax function is similarly displayed in the display part 107 by the controller 100.

In other words, though detailed description is omitted, the screen for performing settings about the fax function also has a configuration provided with a first tab and a second tab. In the configuration, setting items that are frequently changed by the user are displayed in the first tab, whereas, all the setting items are displayed in a form of a list in the second tab. The configuration of the first tab or the second tab is similar to the screen for performing settings about the copy function shown in FIGS. 3 and 4 or the screen for performing settings about the box storage function shown in FIGS. 5, 6A and 6B.

Then, the user performs settings of each item related to the function associated with the selection button 21 to be newly created by use of the screen displayed in the display part 107. In the case where the copy function is selected by the user, the user performs settings of, for example, "duplex/simplex/bookbinding", "number of copies", "number of N-ups (number of pages aggregated in one page)", "magnification", "color mode" and the like. Moreover, in the case where the user selects the box storage function, the user performs settings of "color mode", "document feeding mode", "reading resolution" and the like. Further, in the case where the user selects the fax function, the user performs settings of "transmission destination", "image quality", "magnification" and the like.

It should be noted that, with respect to "transmission destination", it is possible to set one or more transmission destinations in creating a single selection button 21; however, in this specific example, it is assumed that a single transmission destination is set by the user.

Subsequently, the controller 100 determines whether or not a button for starting creation of a one-touch selection button 21 (a button same as the gear-shaped mark 9A shown in FIG. 15A, hereinafter referred to as a creation start button 9A) is selected by a user (step 102-2). It should be noted that, if the creation start button 9A is not selected (NO in step 102-2), the controller 100 waits until the creation start button 9A is selected.

Next, in the case where the controller 100 determines that the creation start button 9A is selected (YES in step 102-2), the controller 100 causes the display part 107 to display a display screen for confirming and changing the contents of settings of the one-touch selection button 21 to be newly created (hereinafter referred to as a one-touch selection button creation screen, or simply referred to as a creation screen) (step 103-2). Specifically, the controller 100 causes the display part 107 to display a creation screen corresponding to the function or setting items associated with the one-touch selection button 21 to be newly created, which have been inputted by the user in step 101-2. In this specific example, as shown in FIG. 12, the controller 100 causes the display part 107 to display a creation screen corresponding to the fax function selected in step 101-2.

Subsequently, on the creation screen, the controller 100 receives input of changes in the contents of settings regarding the one-touch selection button 21 to be newly created (step 104-2). It should be noted that details of the creation screen displayed on the display part 107 in step 103-2 or processes in the case where the input of changes in the contents of settings is received via the creation screen in step 104-2 will be described in detail later.

Next, the controller 100 determines whether or not a creation completion button 38 that is displayed in the creation screen for completing creation of the one-touch selection button 21 has been selected by the user (step 105-2). It should be noted that, in the case where the creation completion button 38 has not been selected (NO in step 105-2), the controller 100 waits until the creation completion button 38 is selected.

Figure 18:
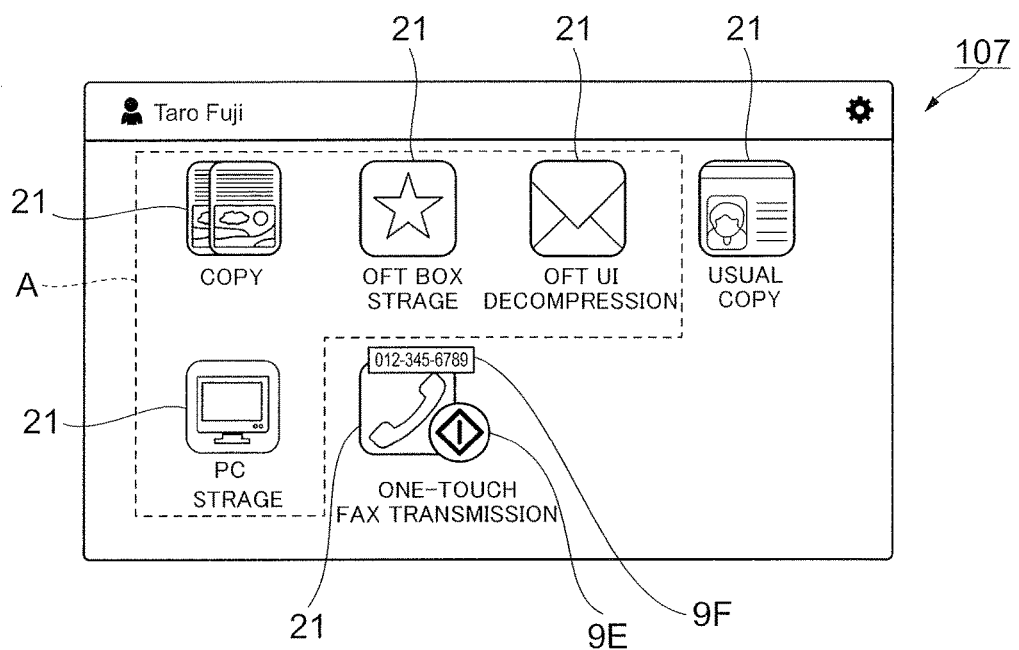
FIG. 18 is a diagram showing a state in which the one-touch selection button having been created is displayed on the home screen.

In the case where the controller 100 determines that the creation completion button 38 is pressed (YES in step 105-2), the controller 100 causes the memory 105 to store the information input of which has been received in step 101-2 or step 104-2 as information related to the selection button 21 to be created (step 106-2). With the above description, creation of the one-touch selection button 21 is completed. It should be noted that, in step 105-2, in the case where it is determined that the creation completion button 38 is pressed, the controller 100 switches the display screen on the display part 107 to the home screen for the user. Then, the one-touch selection button 21 created by the above-described steps is arranged on the home screen, for example, as shown in FIG. 18 by the control of the controller 100. It should be noted that the process of arranging the one-touch selection button 21 on the display region of the home screen will be described in detail later.

Subsequently, details of the creation screen of the one-touch selection button will be described.

In the creation screen of the one-touch selection button, by the control of the controller 100, buttons or boxes for allowing a user to input information required by the user to create the one-touch selection button 21 are displayed. The creation screen of the one-touch selection button shown in FIG. 12 includes: a name box (a first line 31A and a second line 31B); an icon change button 32 (corresponding to the button 9B in FIG. 15B); a destination display selection button 33; and the direct start button 34.

The name box 31 is a box where a name of the one-touch selection button 21 to be created is inputted. The icon change button 32 is a button for changing a design (icon) of the one-touch selection button 21 to be created. The destination display selection button 33 is a button for selecting whether or not a destination is displayed in the icon of the one-touch selection button 21 to be created. The direct start button 34 is a button for selecting the one-touch selection button 21 to be created from the distinction between the one-touch selection button 21 for the direct start and the selection button 21 for displaying the confirmation screen.

Further, the creation screen of the one-touch selection button includes: a kind display part 35; an explanation box 36; a preview display part 37 and the creation completion button 38.

The kind display part 35 is a part where a kind of a function of a process associated with the one-touch selection button 21 to be created is displayed. The explanation box 36 is a box for inputting explanations regarding the one-touch selection button 21 to be created. The preview display part 37 displays a state of the one-touch selection button 21 to be created when the button 21 is displayed on the home screen. The creation completion button 38 is a button for inputting instructions to complete creation of the one-touch selection button 21.

Here, as described above, the name box 31 is a box for inputting a name to be displayed on the display screen (the home screen) together with the icon of the one-touch selection button 21, and is divided into two lines, namely, the first line 31A and the second line 31B. In the exemplary embodiment, in a default state that is initially displayed on the display part 107 when a user selects the creation start button 9A in step 102-2, a name related to the function inputted in step 101-2 is entered in the name box 31 in advance by the control of the controller 100. In this specific example, corresponding to the fax function inputted in step 101-2, "one-touch" is inputted in the first line 31A, and "fax transmission" is inputted in the second line 31B of the name box 31.

In the exemplary embodiment, a user is able to change the name inputted in the name box 31. Specifically, when the user presses the name box 31 (the first line 31A and the second line 31B), a keyboard screen (not shown) is displayed on the display part 107 by the controller 100. The user is able to input an arbitrary name to the name box 31 by use of the displayed keyboard.

The icon change button 32 is a button selected by a user when the icon of the one-touch selection button 21 to be created is changed. Moreover, on the left side in the figure of the icon change button 32, an icon that is presently set is displayed. In the exemplary embodiment, in the default state initially displayed on the display part 107, a design predetermined by the controller 100 is set, and is displayed on the left side in the figure of the icon change button 32.

When the icon change button 32 is selected by the user, an icon selection screen in which plural designs are arranged (refer to FIG. 10) is displayed on the display part 107 by the controller 100. Then, by selecting a design from the icon selection screen, the user is able to change the design of the one-touch selection button 21 to be created. FIG. 12 shows a state in which the icon is changed to the icon for fax.

The destination display selection button 33 is a slide-type button having a knob that is movable to the right or left, and the user is able to select distinction between "YES" and "NO" by sliding the knob to the right or left. It should be noted that the destination display selection button 33 is displayed in the case where, for example, the function selected in step 101-2 includes a function of transferring data (fax transmission or mail transmission) to the outside of the image forming apparatus 10 (refer to FIG. 1).

Though details will be described later, in the case where the user select "YES" on the destination display selection button 33, information regarding the destination of the function associated with the one-touch selection button 21 is displayed together with the icon of the one-touch selection button 21 displayed on the home screen by the control of the controller 100. It should be noted that, in the exemplary embodiment, in the default state of the creation screen initially displayed on the display part 107, the destination display selection button 33 is set as "YES". Consequently, in the case where the user does not operate the destination display selection button 33, the destination is displayed together with the icon of the selection button 21.

As a result, as long as the user does not carry out an operation of changing the destination display selection button 33 to the setting of "NO" in the creation screen of one-touch selection button, the destination is set to be notified to the user. Accordingly, it is possible to suppress occurrence of erroneous transmission, such as transmitting data to an unintended destination, compared to the case where the destination display selection button 33 is set as "NO" in the creation screen in the default state. It should be noted that, in the specific example shown in FIG. 12, the destination display selection button 33 selects "NO".

Similar to the destination display selection button 33, the direct start button 34 is configured with a slide-type button. By sliding the knob on the button to the right or left, the user is able to select "YES" or "NO" (to display the confirmation screen) for the direct start. Here, in the case where "YES" is selected on the direct start button 34, the one-touch selection button 21 to be created becomes "one-touch selection button 21 for the direct start" that starts a process by merely a single selection of the one-touch selection button 21.

In this case, as described above, the icon of the selection button 21 displayed on the home screen is provided with the rhombus-shaped mark 9E (refer to FIGS. 15C and 18). On the other hand, in the case where the user selects "NO" on the direct start button 34, the one-touch selection button 21 to be created becomes "one-touch selection button 21 for displaying the confirmation screen". In this case, the icon of the selection button 21 displayed on the home screen is not provided with the rhombus-shaped mark 9E. It should be noted that, different from the one-touch selection button 21 for the direct start, the selection button 21 for displaying the confirmation screen is a one-touch selection button 21 that does not start a process by merely a single inputting operation (selection operation).

In other words, in the case where the one-touch selection button 21 for displaying the confirmation screen is selected on the home screen by the user, prior to starting the process associated with the one-touch selection button 21 for displaying the confirmation screen, a confirmation screen for confirming the setting contents or the like of the process associated with the one-touch selection button 21 for displaying the confirmation screen is displayed on the display part 107. Then, upon receiving the provision of the confirmation screen, when the user is consent to start the process, the user presses the start button provided in the image forming apparatus 10, to thereby start the process associated with the one-touch selection button 21.

On the other hand, if the user wants to cancel the process after receiving the provision of the confirmation screen, the user presses a cancel button provided in the image forming apparatus 10, and thereby the process associated with the one-touch selection button 21 is not executed and the display part 107 returns to the home screen.

In the exemplary embodiment, in the creation screen displayed in the display part 107 (FIG. 12), although the direct start button 34 is set to "YES" by the user's selection, the direct start button 34 is set to "NO" in the default setting. Consequently, if the user does not carry out an operation of changing the direct start button 34 to "YES", the one-touch selection button 21 to be created becomes "one-touch selection button 21 for displaying confirmation screen".

As a result, the setting is made so that, as long as the user does not carry out an operation of changing the direct start button 34 to the setting of "YES" in the creation screen, the one-touch selection button 21 to be created does not become the one-touch selection button 21 for the direct start. Consequently, it is possible to suppress unintentional creation of the one-touch selection button 21 for the direct start, compared to the case where the direct start button 34 is set as "YES" in the default state. Then, it is possible to suppress unintentional execution of the process associated with the one-touch selection button 21 for the direct start caused by erroneous selection of the one-touch selection button 21 for the direct start by the user.

The kind display part 35 displays a kind of the function associated with the one-touch selection button 21 to be created. The contents displayed in the kind display part 35 are set by the controller 100 in accordance with the function selected in step 101-2, and are incapable of being changed by a user.

As described above, since it is possible for a user to change the icon or name of the one-touch selection button 21 to be created, there are some cases in which the icon or name of the one-touch selection button 21 is changed by a user to those irrelevant to the selected function. In this case, by watching icons or names irrelevant to the function in selecting the function, there is a possibility that a user has a false perception regarding the function associated with the one-touch selection button 21. Consequently, in the exemplary embodiment, the kind of the function associated with the one-touch selection button 21 is displayed in the kind display part 35 for suppressing occurrence of such inconveniences.

In the specific example shown in FIG. 12, the characters "fax transmission" corresponding to the fax function selected in step 101-2 and "(transmission destination: 1) corresponding to the number of transmission destinations set in step 104-2 are displayed in the kind display part 35 by the controller 100.

The explanation box 36 is a box for inputting explanations regarding the one-touch selection button 21 to be created. A user is able to input arbitrary explanations to the explanation box 36. Specifically, when a user presses the explanation box 36, a keyboard screen (not shown) is displayed on the display part 107 by the controller 100.

The user is able to input arbitrary explanations by use of the keyboard. Then, the controller 100 displays the explanations in the explanation box 36, input of which has been received via the keyboard. Moreover, in the exemplary embodiment, there are some cases in which explanations are automatically inputted in the explanation box 36 to be displayed by the controller 100 corresponding to, for example, the function selected in step 101-2 or the item set in the step 104-2.

In this specific example, a phone number set as a transmission destination of fax in step 101-2 is automatically inputted and displayed in the explanation box 36 by the controller 100.

The preview display part 37 is a part displaying how the one-touch selection button 21 to be created is displayed on the home screen as a preview. Specifically, in the preview display part 37, a name inputted to the name box 31 or inputted by default and an icon selected by the icon change button 32 or selected by default are displayed by the controller 100.

Moreover, in the case where "YES" is selected on the destination display selection button 33 by the user, on each of the home screen shown in FIG. 18 and the preview display part 37, information regarding the destination of the selected function (a destination display 9F) is displayed to overlap an upper portion of the icon. Further, in the case where "YES" is selected on the direct start button 34 by the user, on each of the home screen shown in FIG. 18 and the preview display part 37, the rhombus-shaped mark 9E is displayed to overlap the down right of the icon.

Here, in the case where the information set in the name box 31, the icon change button 32, the destination display selection button 33 or the direct start button 34 is changed, the controller 100 of the exemplary embodiment reflects the changed contents in the preview displayed in the preview display part 37 in real time. Accordingly, it becomes possible for a user who creates the selection button 21 to confirm present settings, and thereby, for example, setting of an unintended icon or name in the one-touch selection button 21 to be created can be suppressed.

As described above, the creation completion button 38 is a button for completing creation of the one-touch selection button 21. In the case where the creation completion button 38 is selected by a user, the controller 100 causes the memory 105 (refer to FIG. 1) to store the selected function or setting items. Specifically, in the case where the creation completion button 38 is selected, the controller 100 causes the memory 105 to store the function selected in step 101-2 and the contents of the setting items (such as fax transmission destinations or the number of transmissions) set with respect to the function, the information required to create the one-touch selection button 21 having been set or changed in step 104-2 (such as a name, icon and explanations) and the like that are associated with the one-touch selection button 21 to be created.

It should be noted that information identifying the user who creates the one-touch selection button 21 is also associated with the created one-touch selection button 21 and stored in the memory 105.

The image forming apparatus 10 in the exemplary embodiment (refer to FIG. 1) stores, for example, the creation screen of the one-touch selection button 21 for each function selected in step 101-2 in the memory 105. In the case where the creation start button 9A is selected in step 102-2, the controller 100 reads the creation screen corresponding to the function selected in step 101-2 and causes the display part 107 to display the creation screen.

Moreover, FIG. 12 is an example of the creation screen in the case where the fax function is selected as the process associated with the one-touch selection button 21 to be created. The creation screen in the case where a function other than the fax function is selected as the process associated with the one-touch selection button 21 to be created also has a configuration basically similar to the creation screen shown in FIG. 12. That is, similar to the specific example shown in FIG. 12, the creation screen of a function other than the fax function also includes: the name box 31; the icon change button 32; the direct start button 34; the kind display part 35; the explanation box 36; the preview display part 37; and the creation completion button 38.

In contrast thereto, the destination display selection button 33 is displayed only on the creation screen of the function for transferring the data to the outside of the image forming apparatus 10 (refer to FIG. 1), such as the fax function or the mail transmission function, and is not displayed on the creation screen of the function including no transfer function, such as the copying function.

Incidentally, as described above, the one-touch selection button 21 for the direct start created by the user starts the function (the process) associated with the one-touch selection button 21 by merely a single selection operation by the user. In other words, in the case where the one-touch selection button 21 is selected by the user on the home screen, a process is started without displaying an input screen for inputting setting items, such as a transmission destination of fax or a number of copies, or a confirmation screen for confirming these setting items.

This allows the user to perform the process without selecting the function or inputting the setting items, and thereby provides an effect to save some operations. However, on the other hand, in the case where the user erroneously selects the one-touch selection button 21 by, for example, unintentionally touching the one-touch selection button 21 on the home screen, the process associated with the one-touch selection button 21 is unnecessarily executed. As a result, for example, in a case where a user erroneously selects the one-touch selection button 21 for the direct start with which the function of transferring data to the outside of the image forming apparatus 10, such as the fax transmission function or the mail transmission function, is associated, there is a possibility that the data is inadvertently transferred to an address not intended by the user.

Moreover, in a case where a user erroneously selects the one-touch selection button 21 for the direct start with which a copying function with a large number of copies that involves large consumption of recording materials (sheets) or a scanning function with high resolution that involves large consumption of memory is associated, a large amount of recording materials or memory is inadvertently consumed.

On the other hand, in the case where the one-touch selection button 21 created by a user is the selection button 21 for displaying the confirmation screen, a process is not started by only a single selection operation by the user. In other words, in the case where the one-touch selection button 21 for displaying the confirmation screen is selected by the user on the home screen, first, the confirmation screen regarding the function associated with the selected one-touch selection button 21 is displayed. Then, the user confirms the contents on the confirmation screen, expresses consent to start the process and presses the start button, to thereby start the process of the function associated with the one-touch selection button 21. Accordingly, there are fewer opportunities in which problems as in the case of the one-touch selection button 21 for the direct start occur.

Here, in the image forming apparatus 10 of the exemplary embodiment, when the created one-touch selection button 21 for the direct start is displayed on the home screen, arrangement of the one-touch selection button 21 for the direct start in a predetermined region, where the one-touch selection button 21 for displaying the confirmation screen is able to be arranged, is prohibited by the control of the controller 100. Here, the predetermined region, where the one-touch selection button 21 for displaying the confirmation screen is able to be arranged, is set on a top left side relative to a center of a display region, for example. In other words, in the exemplary embodiment, arrangement of the one-touch selection button 21 for the direct start in the region on the top left side is prohibited in the display region on the home screen. It should be noted that the region on the top left side includes a region on a left side just beside if being at vertically the same position, and also includes a straight above region if being at laterally the same position.

In the case of arranging a newly created one-touch selection button 21 for displaying the confirmation screen in the display region on the home screen, the controller 100 in the exemplary embodiment arranges the one-touch selection button 21 in the region on the top left side of the display region on the home screen, and in the case where the top left side region has already been occupied by other selection buttons 21, the one-touch selection button 21 for displaying the confirmation screen is arranged to the right of those selection buttons 21 in turn. Moreover, in the case where there is no space to arrange to the right, if there is a space on a lower stage, the one-touch selection button 21 for displaying the confirmation screen is arranged on the lower stage in a left-aligned manner, and if there is no space on the lower stage, the controller 100 controls to move to the next page of the home screen, to thereby arrange the one-touch selection button 21 for displaying the confirmation screen in turn from an upper stage in the left-aligned manner in the display region on the next page.

On the other hand, in the case where the one-touch selection button 21 to be arranged in the display region on the home screen is the one-touch selection button 21 for the direct start, the one-touch selection button 21 is not simply arranged in turn in a vacant space of the display region in the left-aligned manner as described above, but arranged in the region except for the predetermined region where the one-touch selection button 21 for displaying the confirmation screen is able to be arranged (for example, the region on the top left side relative to the center portion).

Figure 17:
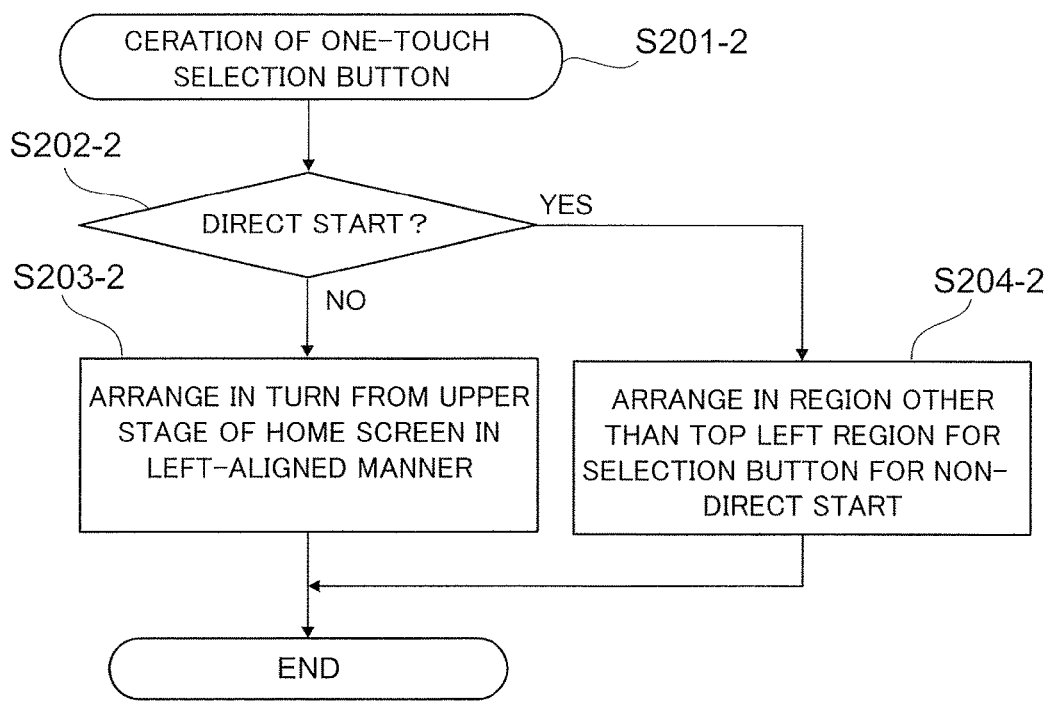
FIG. 17 is a flowchart showing an example of a process executed by a controller when the one-touch selection button is displayed on the home screen.

In this process performed by the controller 100, as shown in FIG. 17, after the creation of the one-touch selection button 21 is completed and stored in the memory 105 (step 201-2), to arrange the one-touch selection button 21 in the display region on the home screen on the display part 107, the controller 100 determines whether or not the one-touch selection button 21 is the one-touch selection button 21 for the direct start (step 202-2). This determination is carried out in accordance with the settings of the direct start button 34 selected in creating the one-touch selection button 21. Specifically, in the case where the direct start button 34 is set to "YES", the controller 100 determines that the one-touch selection button 21 is the one-touch selection button 21 for the direct start (YES in step 202-2).

On the other hand, in the case where the direct start button 34 is set to "NO", the controller 100 determines that the one-touch selection button 21 is not the one-touch selection button 21 for the direct start (NO in step 202-2). When it is determined that the one-touch selection button 21 is the one-touch selection button 21 for the direct start, in arranging the one-touch selection button 21 for the direct start in the display region on the home screen, the controller 100 arranges the one-touch selection button 21 for the direct start in a region except for the top left side region, where the selection buttons 21 other than the one-touch selection button 21 for the direct start (the one-touch selection button 21 for displaying the confirmation screen) are able to be arranged (step 204-2). FIG. 15C is an example of arranging the one-touch selection button 21 on the home screen in this manner.

In the case where it is determined that the one-touch selection button 21 is not the one-touch selection button 21 for the direct start, in arranging the one-touch selection button 21 in the display region on the home screen, the controller 100 arranges in turn the one-touch selection button 21 to the right of the selection button 21 that has already been displayed, and if there is no space to arrange to the right and there is some space to arrange in the lower stage, the controller 100 arranges the one-touch selection button 21 in the lower stage in the left-aligned manner, and further, if there is also no space to arrange in the lower stage, the controller 100 controls to move to the next page of the home screen, to thereby arrange the one-touch selection button 21 in turn from the upper stage in the left-aligned manner in the display region on the display screen of the next page, as described above (step 203-2).

It should be noted that, in the display region on the home screen shown in FIG. 15C, "simple copy", "OFT BOX storage", "OFT UI decompression", "usual copy" and "PC storage", which are ordinary selection buttons 21, are arranged. Neither of these ordinary selection buttons 21 are the one-touch selection button 21 for the direct start. Accordingly, the newly created one-touch selection button 21 for the direct start is arranged in a region to the right of the selection button 21 "PC storage" and in a lower side of the selection button 21 "OFT BOX storage", as an example of the region in the display region except for the top left side region.

Similarly, in the case of the display region on the home screen shown in FIG. 18, "copy", "OFT BOX storage", "OFT UI decompression", "usual copy" and "PC storage", which are ordinary selection buttons 21, are arranged. Neither of these ordinary selection buttons 21 are the one-touch selection button 21 for the direct start. On the other hand, the newly created one-touch selection button 21 for the direct start is arranged in a region to the right of the selection button 21 "PC storage" and in a lower side of the selection button 21 "OFT BOX storage", as an example of the region in the display region except for the top left side region.

Figure 19:
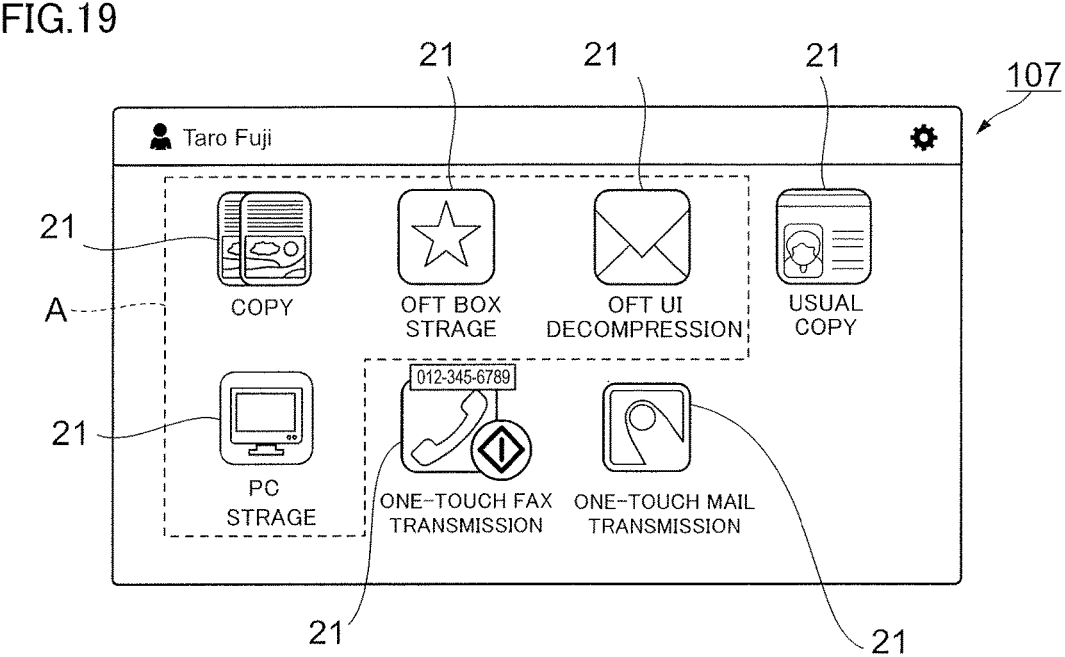
FIG. 19 is a diagram illustrating an example of a case in which a one-touch selection button for displaying a confirmation screen is arranged lately on the home screen.

It should be noted that, for example, in the case where the one-touch selection button 21 for displaying the confirmation screen (for example, "one-touch mail transmission") is to be newly arranged in the state where the one-touch selection button 21 for the direct start is arranged in the display region on the home screen as shown in FIG. 18, the one-touch selection button 21 for displaying the confirmation screen is arranged to the right of the one-touch selection button 21 for the direct start ("one-touch fax transmission") as shown in FIG. 19 in accordance with the control by the controller 100 (step 202-2 to step 203-2) shown in FIG. 17.

In the exemplary embodiment, in the display region on the home screen, ordinary selection buttons 21 are arranged in a default state. The one-touch selection button 21 for the direct start is not arranged in the top left side region in the display region on the home screen. Here, the top left side region of the display region on the home screen (in particular, the region A, which is an upper edge and a left edge enclosed by a broken line in FIGS. 15C, 18 and 19) is a region apt to attract the user's attention in the entire display region on the home screen, and the icons (the selection buttons) arranged in the attractive region are easy to touch.

In the exemplary embodiment, erroneous instructions to execute a process by a user are suppressed, compared to the case where the one-touch selection button 21 for the direct start is freely arranged in all the regions in the display region. Moreover, in the exemplary embodiment, since the one-touch selection button 21 for the direct start is not arranged in the top left region (for example, the region A) involving a possibility of inadvertent touching by a user, erroneous instructions to execute a process by a user are suppressed, compared to the case where arrangement of the one-touch selection button 21 for the direct start to the region other than the top left side relative to the center portion of the display region is prohibited.

It should be noted that the selection buttons 21 arranged in the display region on the home screen, including the one-touch selection 21 for the direct start, are able to be moved to arbitrary positions within the display region on the home screen by a moving operation by a user (for example, an operation to drag and drop the selection button 21 displayed on the home screen). Even in this moving operation, a region where the one-touch selection button 21 for the direct start can be arranged is limited by the above-described control of the controller 100. Accordingly, it is impossible to move the one-touch selection button 21 for the direct start to such a region, where arrangement thereof is prohibited, by user's operation.

Third Exemplary Embodiment

In a third exemplary embodiment, in the image forming apparatus 10, similar to the above description, the home screen is configured with plural pages, and in default, a display screen of the first page of the plural pages is displayed on the display part 107. Then, by performing a flicking operation on "background" portion other than the selection buttons 21 in the page displayed on the display part 107, the pages are switched. When the pages are switched, other selection buttons 21 that have not appeared on the display screen of the page displayed before the flicking operation come to appear. In the exemplary embodiment, the display screen of the first page (an example of a first display screen) is displayed in priority to the display screens of the second and subsequent pages (an example of a second display screen).

In the exemplary embodiment, the one-touch selection button 21 for displaying the direct start may be arranged in both the display screen of the first page and the display screen of the second page on the home screen, whereas, arrangement of the one-touch selection button 21 for the direct start in the first page of the home screen may be prohibited by the control of the controller 100. In other words, the one-touch selection button 21 for the direct start is arranged in the display region on the display screen of the second and subsequent pages on the home screen by the control of the controller 100.

Figure 20:
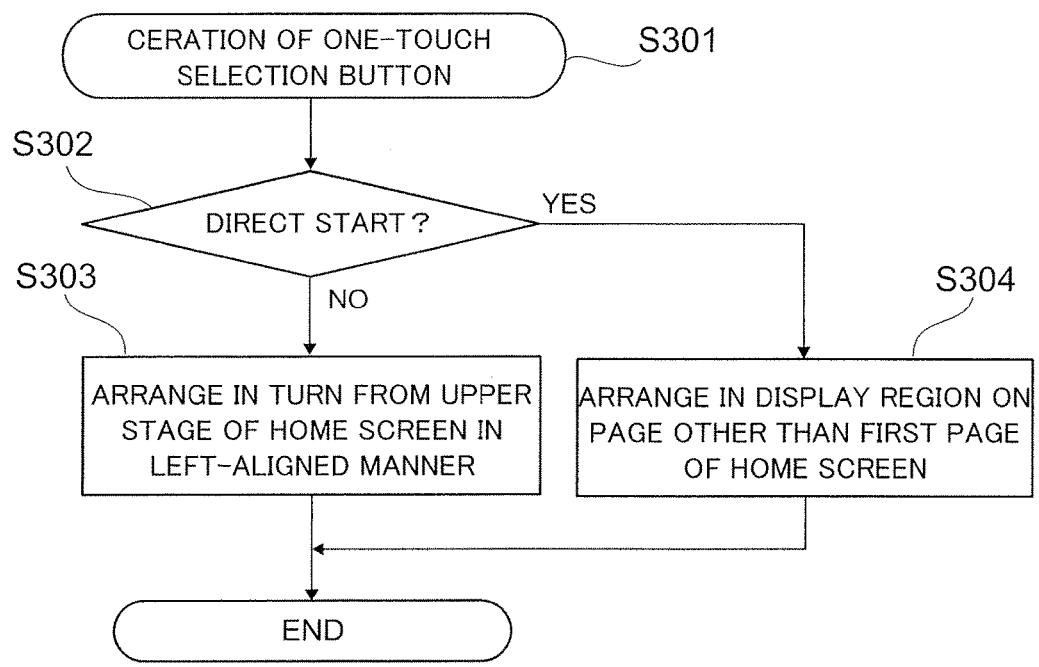
FIG. 20 is a flowchart showing an example of a process executed by a controller when the one-touch selection button is displayed on the home screen in a third exemplary embodiment.

The process by the controller 100 in this case is as follows as shown in FIG. 20. The creation of the one-touch selection button 21 is completed and stored in the memory 105 (step 301). In arranging the one-touch selection button 21 in the display region on the home screen of the display part 107, the controller 100 determines whether or not the one-touch selection button 21 is the one-touch selection button 21 for the direct start (step 302). This determination is made in accordance with the settings of the direct start button 34 selected in creating the one-touch selection button 21. Specifically, in the case where the direct start button 34 is set to "YES", the controller 100 determines that the one-touch selection button 21 is the one-touch selection button 21 for the direct start (YES in step 302). On the other hand, in the case where the direct start button 34 is set to "NO", the controller 100 determines that the one-touch selection button 21 is not the one-touch selection button 21 for the direct start (NO in step 302).

If it is determined that controller 100 determines that the one-touch selection button 21 is the one-touch selection button 21 for the direct start, in arranging the one-touch selection button 21 for the direct start in the display region on the home screen, the controller 100 arranges the one-touch selection button 21 for the direct start in one of the second and subsequent pages (step 304).

If it is determined that controller 100 determines that the one-touch selection button 21 is not the one-touch selection button 21 for the direct start, in arranging the one-touch selection button 21 in the display region on the home screen, the controller 100 arranges the one-touch selection button 21 to the right of the selection button 21 that has already been displayed in the display region on the home screen in turn. At this time, if there is no space to arrange to the right of the selection button 21 and there is a space on a lower stage, the one-touch selection button 21 is arranged on the lower stage in a left-aligned manner, and if there is no space on the lower stage, the controller 100 controls to move to the next page of the home screen, to thereby arrange the one-touch selection button 21 in turn from an upper stage in the left-aligned manner in the display region on the display screen of the next page (step 303).

Figure 21:
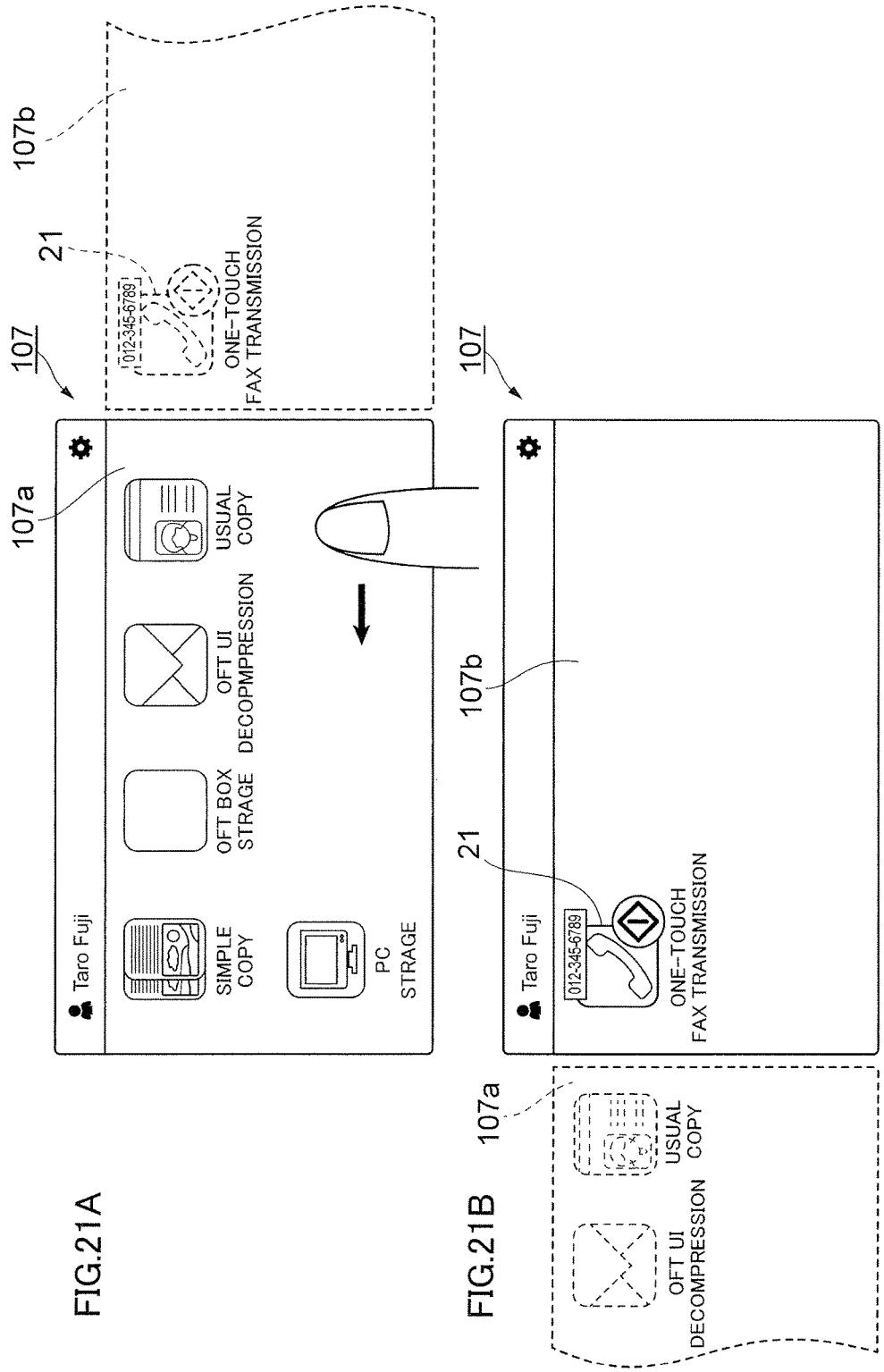
FIGS. 21A and 21B are diagrams showing examples of states in which the one-touch selection button is arranged on the home screen.

FIGS. 21A and 21B are an example of the one-touch selection button 21 arranged on the home screen in this manner. FIG. 21A shows a state in which a display screen 107a of the first page of the home screen is displayed on the display part 107 in default, and the newly created one-touch selection button 21 for the direct start ("one-touch fax transmission") is arranged in a display screen 107b of the second page of the home screen, however, the display screen 107b of the second page is not displayed on the display part 107. Then, by user's flicking operation on the "background" portion in the first page of the home screen displayed on the display part 107 to the left direction in the figure, the display screen displayed on the display part 107 is switched from the display screen 107a of the first page to the display screen 107b of the second page as shown in FIG. 21B, and thereby the one-touch selection button 21 for the direct start ("one-touch fax transmission") having been arranged in the display screen 107b of the second page is displayed.

In the exemplary embodiment thus configured, the one-touch selection button 21 for the direct start is not arranged in the display screen of the first page of the home screen displayed on the display part 107 in default, and the one-touch selection button 21 for the direct start is displayed on the display part 107 by way of inputting a switching operation (a flicking operation or the like) for the display screen displayed on the display part 107. Accordingly, in the exemplary embodiment, erroneous instructions to execute a process by a user are suppressed, compared to the case where the one-touch selection button 21 for the direct start is able to be arranged in both of the display screen 107a of the first page and the display screen 107b of the second page. Moreover, in the exemplary embodiment, erroneous instructions to execute a process by a user are suppressed, compared to the case where the one-touch selection button 21 for the direct start is arranged in the display region of the display screen 107a of the first page, which is displayed with priority.

It should be noted that, in FIGS. 21A and 21B, the newly created one-touch selection button 21 for the direct start is arranged in the top left region, which is the top of the display screen 107b of the second page of the home screen; however, the control by the controller 100 is not limited thereto, and the control may be performed so that the one-touch selection button 21 for the direct start is arranged in another region of the second page, or in the display screen in one of the third and subsequent pages (not shown).

However, if the one-touch selection button 21 for the direct start is arranged in the display screen in one of the third and subsequent pages without arranging merely a single selection button 21 in the display screen 107b of the second page, the one-touch selection button 21 for the direct start is displayed on the display part 107 by way of a blank page (the display screen of the second page). In this case, there is a possibility that a user forgets or is not aware of existence of the display screen itself in one of the third and subsequent pages. Consequently, the controller 100 may control so that the one-touch selection button 21 for the direct start is arranged in the display region in the second and subsequent pages in the left-aligned manner, not to generate a blank page.

The third exemplary embodiment includes no difference from the second exemplary embodiment except for the control of displaying the one-touch selection button 21 for the direct start on the home screen by the controller 100, and the configuration, operations and effects other than those particularly mentioned are same as the configuration, operations and effects described in the image forming apparatus 10 of the second exemplary embodiment, and thereby description thereof will be omitted.

It should be noted that the selection buttons 21 arranged in the display region on the home screen, including the one-touch selection 21 for the direct start, are able to be moved to arbitrary positions within the display region on the home screen by a moving operation by a user (for example, an operation to drag and drop the selection button 21 displayed on the home screen). However, even in the case of the moving operation, a region where the one-touch selection button 21 for the direct start can be arranged is limited by the above-described control of the controller 100. Accordingly, it is impossible to move the one-touch selection button 21 for the direct start to such a region, where arrangement thereof is prohibited, by user's operation.

Fourth Exemplary Embodiment

In the image forming apparatus 10 of the above-described exemplary embodiments, in arranging the one-touch selection button 21 for the direct start on the home screen, the controller 100 limits the region where the one-touch selection button 21 for the direct start is able to be arranged. However, a one-touch selection button 21 created by a person other than the user is applicable as a target of the control for limiting the arrangement region. In other words, in displaying the created one-touch selection button 21 (an example of a process receiving unit) on the home screen of a user, if the one-touch selection button 21 has been created by a person different from the user, the controller 100 prohibits arrangement of the one-touch selection button 21 created by the person other than the user in a predetermined region in the display region of the home screen. Here, the predetermined region, where arrangement of the one-touch selection button 21 created by the person other than the user is prohibited, is, for example, the top left side region relative to the center of the display region. That is, in the exemplary embodiment, arrangement of the one-touch selection button 21 created by the person other than the user in the top left side region in the display region of the home screen is prohibited. It should be noted that the region on the top left side includes a region on a left side just beside if being at vertically the same position, and also includes a straight above region if being at laterally the same position.

In the exemplary embodiment, for example, a one-touch selection button 21 that is allowed to be shared by persons other than a user and created by a person other than the user is arranged in, for example, in a not-shown shared region or the like, and any person who has an authority to use the image forming apparatus 10 is able to use the one-touch selection button 21 freely, and is able to arrange the one-touch selection button 21 on the home screen of the user. In the case where the above-described one-touch selection button 21 created by the person other than the user is arranged by the user in the display region on the home screen of the user of his/her own, the controller 100 does not simply arrange the one-touch selection button 21 in a vacant space of the display region in the left-aligned manner in turn, but prohibits arrangement of the one-touch selection button 21 created by the person other than the user in the predetermined region (in the exemplary embodiment, for example, the top left region) and arranges the one-touch selection button 21 in a region other than the predetermined region.

Figure 22:
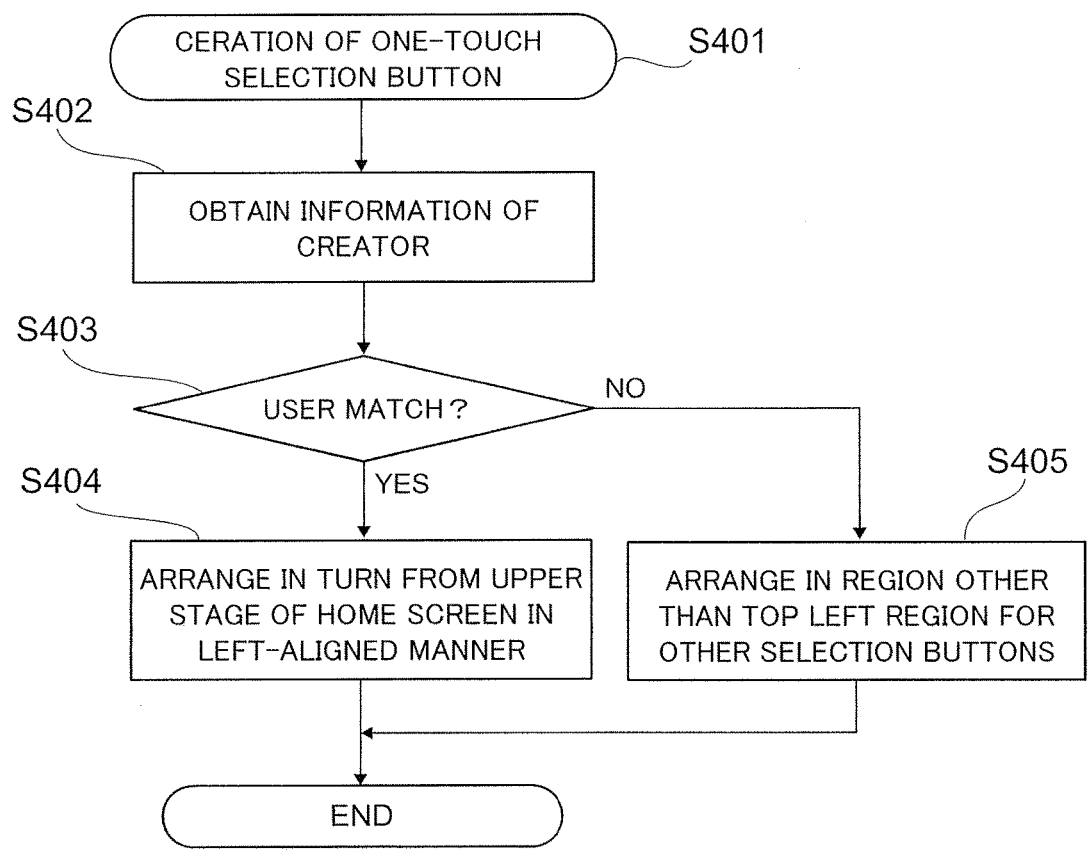
FIG. 22 is a flowchart showing an example of a process executed by a controller when the one-touch selection button is displayed on the home screen in a fourth exemplary embodiment.

This process by the controller 100 is as follows as shown in FIG. 22. The creation of the one-touch selection button 21 is completed and stored in the memory 105 (step 401). In arranging the one-touch selection button 21 in the display region on the home screen of the display part 107, the controller 100 obtains information regarding a creator of the one-touch selection button 21 (step 402). The information regarding the creator is stored in the memory 105 in association with the created one-touch selection button 21.

Then, when the controller 100 reads the one-touch selection button 21 selected by a user to arrange thereof on the home screen, the controller 100 obtains the information regarding the creator of the one-touch selection button 21 by reading the information regarding the creator, which is associated with the one-touch selection button 21, from the memory 105.

Subsequently, based on the read information regarding the creator, the controller 100 determines whether or not the creator of the one-touch selection button 21 matches the user (step 403). As described above, since the user of the home screen has been identified by the method of reading an ID number recorded on an ID card, etc., the controller 100 is able to determine whether or not the user of the home screen matches the creator of the one-touch selection button 21.

Figure 23:
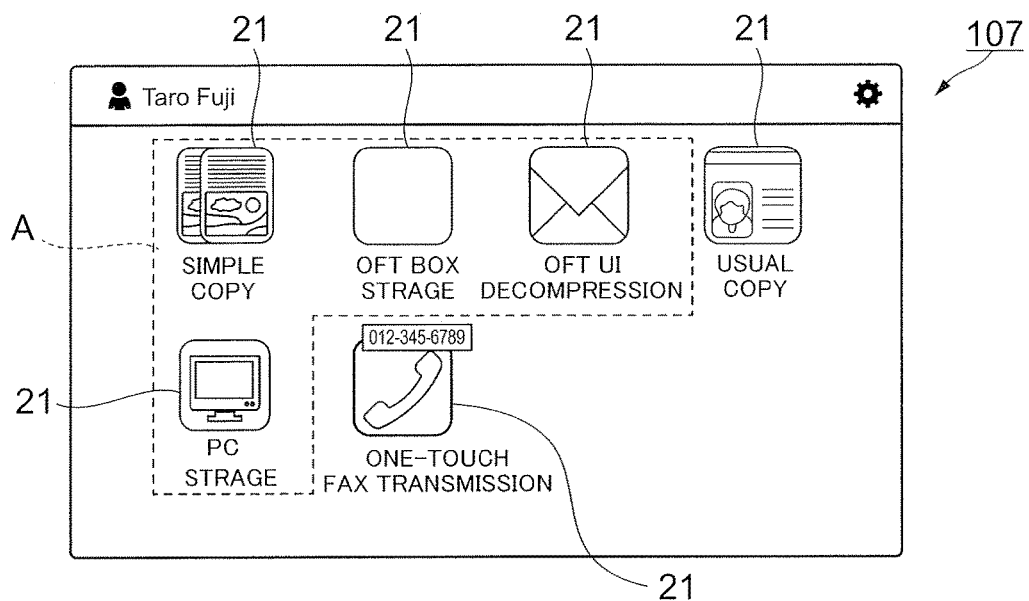
FIG. 23 is a diagram showing an example of a state in which a one-touch selection button created by another person is displayed on the home screen.

If it is determined that the creator of the one-touch selection button does not match the user (NO in step 403), in arranging the one-touch selection button 21 in the display region of the home screen, the controller 100 arranges the one-touch selection button 21 in a region that is not the top left side region relative to the center portion (step 405). FIG. 23 is an example of arrangement of the one-touch selection button 21 on the home screen in this manner.

In FIG. 23, buttons represented as "simple copy", "OFT BOX storage", "OFT UI decompression", "usual copy" and "PC storage" are the one-touch selection buttons 21 created by the user himself/herself or other selection buttons 21, which are the selection buttons 21 set in advance, and a button represented as "one-touch fax transmission" is the one-touch selection button 21 created by a person other than the user.

On the other hand, if it is determined that the creator of the one-touch selection button 21 matches the user (YES in step 403), in arranging the one-touch selection button 21 in the display region of the home screen, the controller 100 arranges the one-touch selection button 21 to the right of the selection button 21 that has already been displayed in the display region on the home screen in turn. If there is no space to arrange to the right of the selection button 21 and there is a space on a lower stage, the one-touch selection button 21 is arranged on the lower stage in a left-aligned manner, and if there is no space on the lower stage, the controller 100 controls to move to the next page of the home screen, to thereby arrange the one-touch selection button 21 in turn from an upper stage in the left-aligned manner in the display region on the display screen of the next page (step 404).

It should be noted that, in the display region of the home screen shown in FIG. 23, ordinary selection buttons 21 "simple copy", "OFT BOX storage", "OFT UI decompression", "usual copy" and "PC storage" are arranged. None of these ordinary buttons 21 is the one-touch selection button 21 created by the person other than the user. The one-touch selection button 21 newly created by the person other than the user ("one-touch fax transmission") is arranged to the right of the selection button 21 "PC storage" and below the selection button 21 "OFT BOX storage", which is an example of a region that is not on the top left side relative to the center portion of the display region.

The top left side region of the display region on the home screen is a region apt to attract the user's attention in the entire display region on the home screen, and the icons (the selection buttons) arranged in the attractive region are easy to touch. In the exemplary embodiment, in the region where a user possibly touches inadvertently (in particular, the region A, which is an upper edge and a left edge enclosed by a broken line in FIG. 23), the one-touch selection button 21 created by the person other than the user is not arranged. Accordingly, in the case where a one-touch selection button 21 is created by a person other than a user, instructions for a process provided by erroneous touch of the one-touch selection button 21 by the user are suppressed. Moreover, the exemplary embodiment suppresses erroneous instructions for a process provided by the user, compared to a case where arrangement of the one-touch selection button 21 created by the person other than the user in a region other than the top left side relative to the center portion of the display region is prohibited.

The fourth exemplary embodiment includes no difference from the second exemplary embodiment except for the control of displaying the one-touch selection button 21 created by a person other than a user on the home screen by the controller 100, and the configuration, operations and effects other than those particularly mentioned are same as the configuration, operations and effects described in the image forming apparatus 10 of the second exemplary embodiment, and thereby description thereof will be omitted.

It should be noted that the selection buttons 21 arranged in the display region on the home screen, including the one-touch selection 21 created by a person other than a user, are able to be moved to arbitrary positions within the display region on the home screen by a moving operation by a user (for example, an operation to drag and drop the selection button 21 displayed on the home screen). However, even in the case of the moving operation, a region where the one-touch selection button 21 created by a person other than a user can be arranged is limited by the above-described control of the controller 100. Accordingly, it is impossible to move the one-touch selection button 21 created by a person other than a user to such a region, where arrangement thereof is prohibited, by user's operation.

Fifth Exemplary Embodiment

Figure 24:
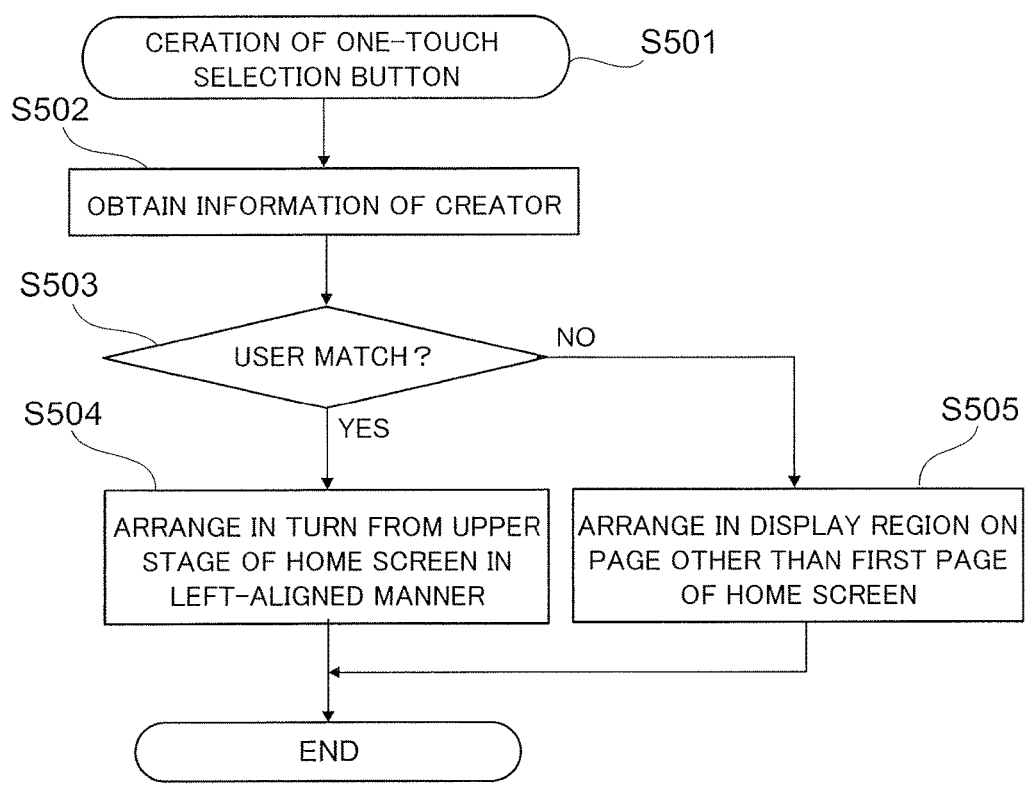
FIG. 24 is a flowchart showing an example of a process executed by a controller when the one-touch selection button is displayed on the home screen in a fifth exemplary embodiment.

In a fifth exemplary embodiment, arrangement of the one-touch selection button 21 created by a person other than a user in the first page of the home screen may be prohibited by the control of the controller 100. In other words, the one-touch selection button 21 for the direct start is arranged in the display region on the display screen of the second and subsequent pages on the home screen by the control of the controller 100. The process by the controller 100 in this case is as follows as shown in FIG. 24. The creation of the one-touch selection button 21 is completed and stored in the memory 105 (step 501). In arranging the one-touch selection button 21 in the display region on the home screen of the display part 107, the controller 100 obtains information regarding a creator of the one-touch selection button 21 (step 502).

The information regarding the creator is stored in the memory 105 in association with the created one-touch selection button 21. Then, when the controller 100 reads the one-touch selection button 21 selected by a user to arrange thereof on the home screen, the controller 100 obtains the information regarding the creator of the one-touch selection button 21 by reading the information regarding the creator, which is associated with the one-touch selection button 21, from the memory 105.

Subsequently, based on the read information regarding the creator, the controller 100 determines whether or not the creator of the one-touch selection button 21 matches the user (step 503). As described above, since the user of the home screen has been identified by the method of reading an ID number recorded on an ID card, etc., the controller 100 is able to determine whether or not the user of the home screen matches the creator of the one-touch selection button 21.

If it is determined that the creator of the one-touch selection button 21 does not match the user (NO in step 503), in arranging the one-touch selection button 21 in the display region of the home screen, the controller 100 arranges the one-touch selection button 21 created by the person other than the user in one of the second and subsequent pages (step 505). On the other hand, if it is determined that the one-touch selection button 21 is created by the user by himself/herself (YES in step 503), the controller 100 arranges the one-touch selection button 21 in the display region on the home screen. At this time, the one-touch selection button 21 is arranged in turn to the right of the selection button 21 that has already been displayed in the display region on the home screen. In the case where there is no space to arrange to the right of the selection button 21 and there is a space on a lower stage, the one-touch selection button 21 is arranged on the lower stage in a left-aligned manner. If there is also no space on the lower stage, the controller 100 controls to move to the next page of the home screen, to thereby arrange the one-touch selection button 21 in turn from an upper stage in the left-aligned manner in the display region on the display screen of the next page (step 504). It should be noted that, in the exemplary embodiment, the display screen of the first page (an example of a first display screen) is displayed in priority to the display screens of the second and subsequent pages (an example of a second display screen).

Figure 25:
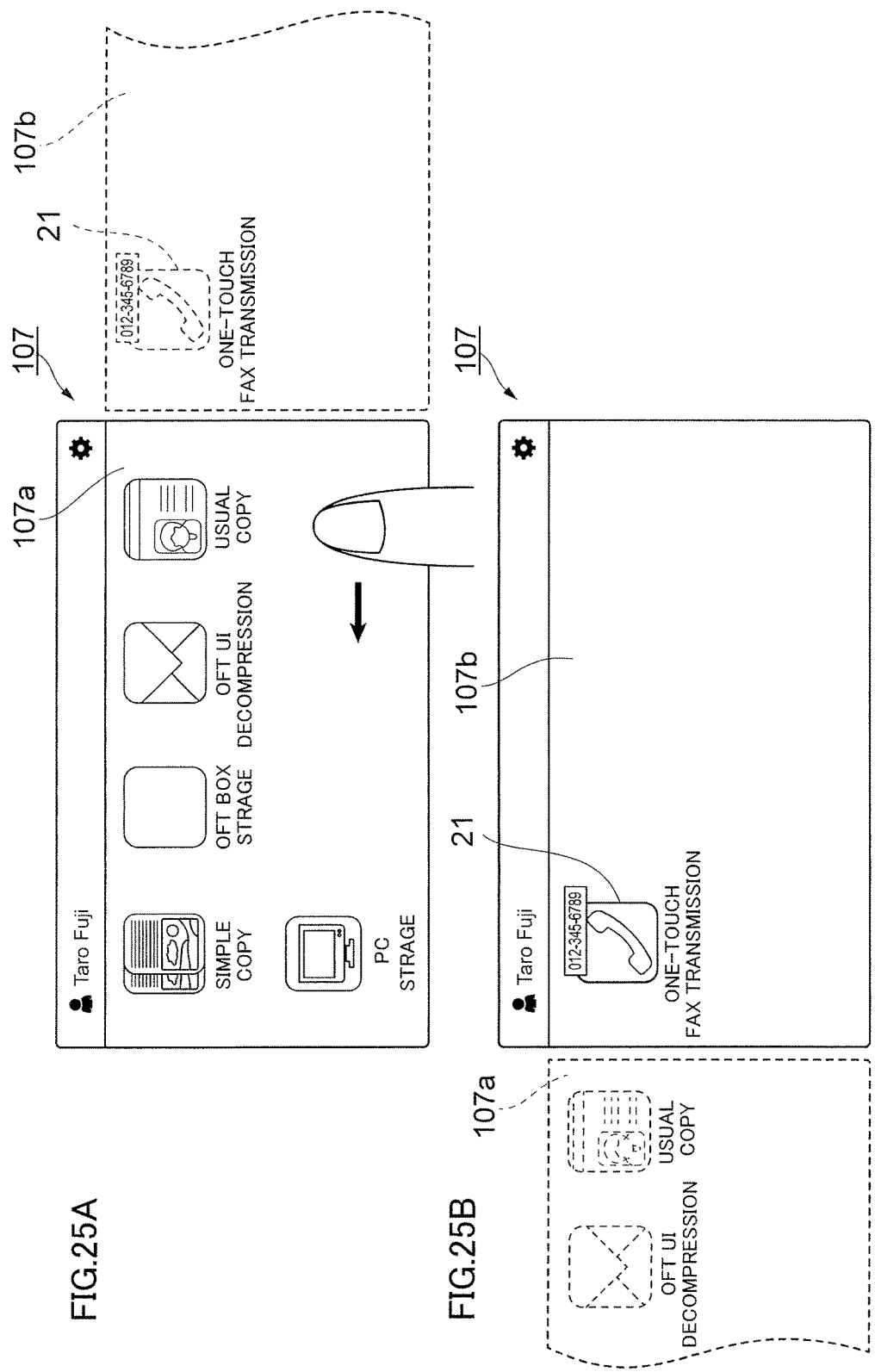
FIGS. 25A and 25B are diagrams showing examples of states in which the one-touch selection button is arranged on the home screen.

FIGS. 25A and 25B are an example of the one-touch selection button 21 arranged on the home screen in this manner. FIG. 25A shows a state in which a display screen 107a of the first page of the home screen is displayed on the display part 107 in default, and the one-touch selection button 21 created by the person other than the user to be newly displayed ("one-touch fax transmission") is arranged in a display screen 107b of the second page of the home screen, however, the display screen 107b of the second page is not displayed on the display part 107. Then, by user's flicking operation on the "background" portion in the first page of the home screen displayed on the display part 107 to the left direction in the figure, the display screen displayed on the display part 107 is switched from the display screen 107a of the first page to the display screen 107b of the second page as shown in FIG. 25B, and thereby the one-touch selection button 21 created by the person other than the user ("one-touch fax transmission") having been arranged in the display screen 107b of the second page is displayed.

In the exemplary embodiment configured in this manner, the one-touch selection button 21 created by the person other than the user is not arranged in the display screen of the first page of the home screen displayed on the display part 107 in default, and the one-touch selection button 21 created by the person other than the user is displayed on the display part 107 by way of inputting a switching operation (a flicking operation or the like) for the display screen displayed on the display part 107. Accordingly, in the exemplary embodiment, erroneous instructions to execute a process by a user are suppressed, compared to the case where the one-touch selection button 21 is created by the person other than the user and the one-touch selection button 21 is able to be arranged in both of the display screen 107a of the first page and the display screen 107b of the second page. Moreover, in the exemplary embodiment, erroneous instructions to execute a process by a user are suppressed, compared to the case where the one-touch selection button 21 created by the person other than the user is arranged in the display region of the display screen 107a of the first page, which is displayed with priority.

It should be noted that, in FIGS. 25A and 25B, the one-touch selection button 21 created by the person other than the user is arranged in the top left region, which is the top of the display screen 107b of the second page of the home screen. However, the control by the controller 100 is not limited thereto, and the control may be performed so that the one-touch selection button 21 created by the person other than the user is arranged in another region of the second page, or in the display screen in one of the third and subsequent pages (not shown).

However, if the one-touch selection button 21 created by the person other than the user is arranged in the display screen in one of the third and subsequent pages without arranging merely a single selection button 21 in the display screen 107b of the second page, the one-touch selection button 21 for the direct start is displayed on the display part 107 by way of a blank page (the display screen of the second page). In this case, there is a possibility that a user forgets or is not aware of existence of the display screen itself in one of the third and subsequent pages. Consequently, the controller 100 may control so that the one-touch selection button 21 created by the person other than the user is arranged in the display region in the second and subsequent pages in the left-aligned manner, not to generate a blank page.

The fifth exemplary embodiment includes no difference from the second exemplary embodiment except for the control of displaying the one-touch selection button 21 created by a person other than a user on the home screen by the controller 100, and the configuration, operations and effects other than those particularly mentioned are same as the configuration, operations and effects described in the image forming apparatus 10 of the second exemplary embodiment, and thereby description thereof will be omitted.

It should be noted that the selection buttons 21 arranged in the display region on the home screen, including the one-touch selection 21 created by a person other than a user, are able to be moved to arbitrary positions within the display region on the home screen by a moving operation by a user (for example, an operation to drag and drop the selection button 21 displayed on the home screen). However, even in the case of the moving operation, a region where the one-touch selection button 21 created by a person other than a user can be arranged is limited by the above-described control of the controller 100. Accordingly, it is impossible to move the one-touch selection button 21 created by a person other than a user to such a region, where arrangement thereof is prohibited, by user's operation.

Sixth Exemplary Embodiment

In the image forming apparatus 10 in each of the second to fifth exemplary embodiments, the controller 100 controls so that, in arranging the one-touch selection button 21 for the direct start or the one-touch selection button 21 created by a person other than a user, a region where the one-touch selection button 21 is limited. In the image forming apparatus 10 in a sixth exemplary embodiment, the controller 100 performs control so that movement of the one-touch selection button 21 for the direct start or the one-touch selection button 21 created by the person other than the user to the prohibited region is permitted after the number of times of starting the process associated with those one-touch selection buttons 21 reaches a preset number of times by selecting the one-touch selection button 21 for the direct start or the one-touch selection button 21 created by the person other than the user, even though the region to arrange the one-touch selection button 21 for the direct start or the one-touch selection button created by the person other than the user is limited in the image forming apparatus 10 in the second to fifth exemplary embodiments.

That is, in the image forming apparatus 10 in the second exemplary embodiment, arrangement of the one-touch selection button 21 for the direct start in the top left side region relative to the center portion of the display region is prohibited on the home screen. However, in the sixth exemplary embodiment, after the one-touch selection button 21 for the direct start is started not less than the preset number of times, movement of the one-touch selection button 21 for the direct start to the top left side region, where arrangement of the one-touch selection button 21 for the direct start is prohibited, is permitted by the control of the controller 100. In other words, in the exemplary embodiment, based on a status of utilization of the process associated with the one-touch selection button 21 for the direct start, by the control of the controller 100, prohibition of arrangement of the one-touch selection button 21 for the direct start in the region where arrangement thereof is prohibited is cancelled, or is able to be cancelled.

Moreover, in the image forming apparatus 10 in the third exemplary embodiment, arrangement of the one-touch selection button 21 for the direct start in the display screen 107a of the first page is prohibited on the home screen. However, in the sixth exemplary embodiment, after the one-touch selection button 21 for the direct start is started not less than the preset number of times, movement of the one-touch selection button 21 for the direct start to the display screen 107a of the first page, where arrangement of the one-touch selection button 21 for the direct start is prohibited, is permitted on the home screen by the control of the controller 100. In other words, in the exemplary embodiment, based on a status of utilization of the process associated with the one-touch selection button 21 for the direct start, by the control of the controller 100, prohibition of arrangement of the one-touch selection button 21 for the direct start in the region where arrangement thereof is prohibited is cancelled, or is able to be cancelled.

Moreover, in the image forming apparatus 10 in the fourth exemplary embodiment, arrangement of the one-touch selection button 21 created by the person other than the user in the top left side region relative to the center portion of the display region is prohibited on the home screen. However, in the sixth exemplary embodiment, after the one-touch selection button 21 created by the person other than the user is started not less than the preset number of times, movement of the one-touch selection button 21 created by the person other than the user to the top left side region, where arrangement of the one-touch selection button 21 created by the person other than the user is prohibited, is permitted by the control of the controller 100. In other words, in the exemplary embodiment, based on a status of utilization of the process associated with the one-touch selection button 21 created by the person other than the user, by the control of the controller 100, prohibition of arrangement of the one-touch selection button 21 created by the person other than the user in the region where arrangement thereof is prohibited is cancelled, or is able to be cancelled.

Moreover, in the image forming apparatus 10 in the fifth exemplary embodiment, arrangement of the one-touch selection button 21 created by the person other than the user in the display screen 107a of the first page is prohibited on the home screen. However, in the sixth exemplary embodiment, after the one-touch selection button 21 created by the person other than the user is started not less than the preset number of times, movement of the one-touch selection button 21 created by the person other than the user to the display screen 107a of the first page, where arrangement of the one-touch selection button 21 created by the person other than the user is prohibited, is permitted on the home screen by the control of the controller 100. In other words, in the exemplary embodiment, based on a status of utilization of the process associated with the one-touch selection button 21 created by the person other than the user, by the control of the controller 100, prohibition of arrangement of the one-touch selection button 21 created by the person other than the user in the region where arrangement thereof is prohibited is cancelled, or is able to be cancelled.

Figure 26:
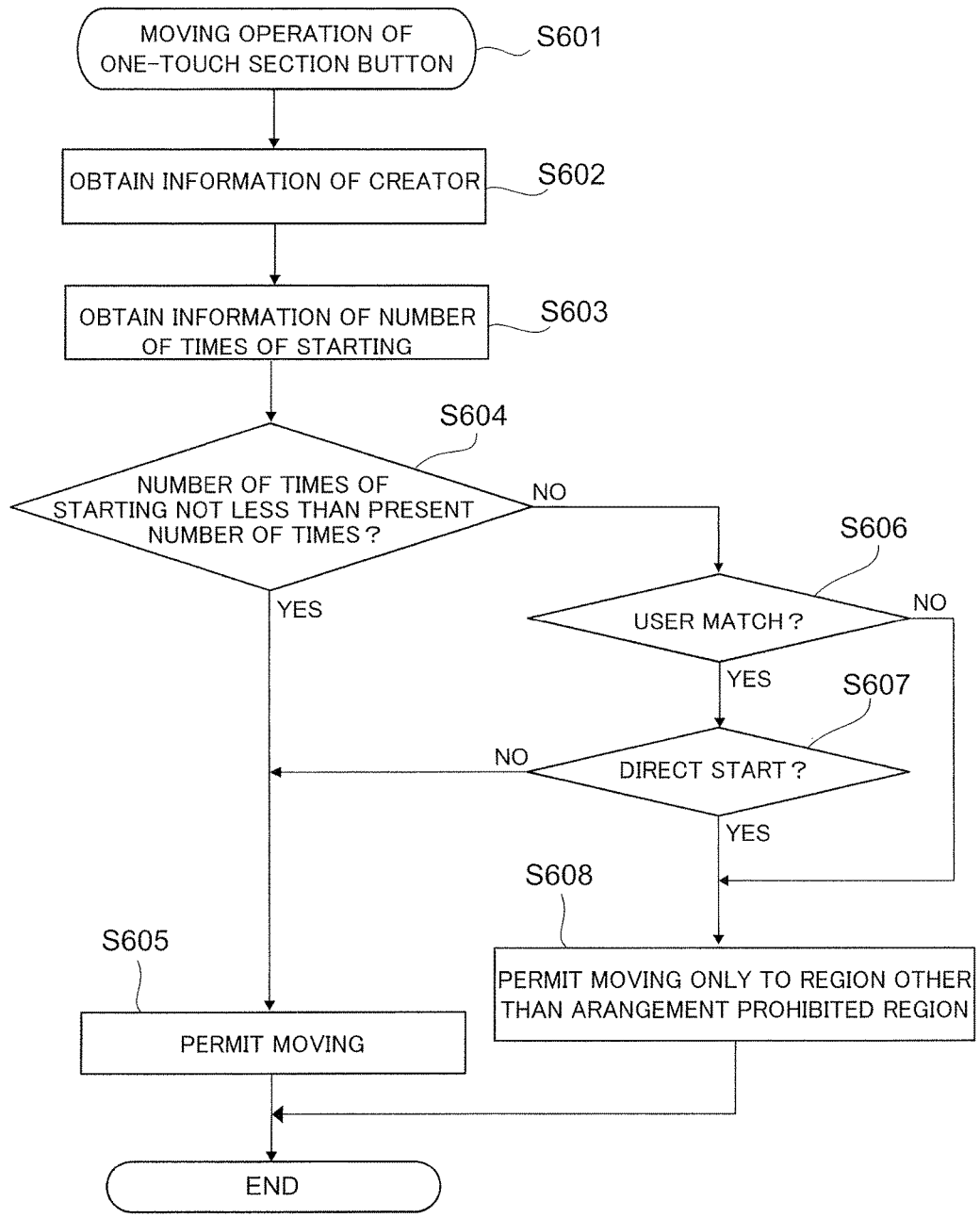
FIG. 26 is a flowchart showing an example of a process executed by a controller when the one-touch selection button is moved in a display region of the home screen in a sixth exemplary embodiment.

In the image forming apparatus 10 in the sixth exemplary embodiment, the number of times of starting the one-touch selection button 21 for the direct start or the number of times of starting the one-touch selection button 21 created by the person other than the user is counted by the controller 100 every time these one-touch selection buttons 21 are selected and started, and the number of times of starting is stored per each one-touch selection button 21 in the memory 105. Then, the process by the controller 100 to perform control of movement of the selection button 21 in the display region on the home screen is as shown in FIG. 26. If a user drags the one-touch selection button 21 to be moved, the controller 100 detects the moving operation (step 601), and the controller 100 obtains information regarding a creator associated with the one-touch selection button 21 (step 602).

The information regarding the creator is obtained as described in the fourth and fifth exemplary embodiments.

Next, the controller 100 obtains the number of times of starting the one-touch selection button 21 from the memory 105 (step 603). Then, the controller 100 determines whether or not the number of times of starting is not less than the preset number of times (step 604).

The preset number of times may be stored in the ROM 103 in the controller 100 in the non-rewritable manner or may be stored in the RAM 104 in the controller 100 in a rewritable manner. Moreover, the preset number of times is set experimentally or empirically as a number of times of the order, in which, for example, even if the one-touch selection button 21 is arranged in the prohibited region, it is considered that a user does not erroneously select and start the one-touch selection button 21.

If the controller 100 determines that the number of times of starting obtained from the memory 105 is not less than the preset number of times (YES in step 604), the controller 100 permits movement of the one-touch selection button 21 to an arbitrary region in the display region on the home screen against the moving operation to drag and drop by the user, and arranges the one-touch selection button 21 in the region where the user carries out the operation to drop (step 605).

On the other hand, if the controller 100 determines that the number of times of starting obtained from the memory 105 is less than the preset number of times (NO in step 604), the controller 100 determines whether or not the creator of the one-touch selection button 21 matches the user (step 606). If the controller 100 determines that the creator of the one-touch selection button 21 matches the user (YES in step 606), the controller 100 subsequently determines whether or not the one-touch selection button 21 is the one-touch selection button 21 for the direct start (step 607).

Then, if the controller 100 determines that the one-touch selection button 21 is not the one-touch selection button 21 for the direct start (NO in step 607), the controller 100 permits movement of the one-touch selection button 21 to an arbitrary region in the display region on the home screen against the moving operation to drag and drop by the user, and arranges the one-touch selection button 21 in the region where the user carries out the operation to drop (step 605).

On the other hand, if the controller 100 determines that the creator of the one-touch selection button 21 does not match the user (NO in step 606) and that the one-touch selection button 21 is the one-touch selection button 21 for the direct start (YES in step 607), the controller 100 does not permit movement of the one-touch selection button 21 to the prohibited region of the display region on the home screen against the moving operation to drag and drop by the user. Then, the controller 100 permits movement of the one-touch selection button 21 within a range of a region other than the region prohibited against the one-touch selection button 21 (step 608). As a result, in the case where the user carries out the operation to drop in the permitted region, the one-touch selection button 21 is arranged in the region where the operation to drop is carried out, whereas, in the case where the user carries out the operation to drop in the prohibited region, the one-touch selection button 21 is returned to and arranged in an original region where the one-touch selection button 21 exists before the moving operation.

In this manner, in the image forming apparatus 10 in the sixth exemplary embodiment, even though a one-touch selection button 21 is the one-touch selection button 21 for the direct start or the one-touch selection button 21 created by a person other than a user, after a number of times of starting thereof reaches a preset number of times, each one-touch selection button 21 is able to be arranged in a region where arrangement thereof has been prohibited because a possibility of inadvertent execution is reduced.

It should be noted that, in the sixth exemplary embodiment, prohibition of arrangement of the one-touch selection button 21 in the predetermined region where arrangement thereof is prohibited is cancelled in accordance with the number of times of starting the process associated with the one-touch selection button 21, arrangement of which in the predetermined region is prohibited. However, the process of cancelling the prohibition of arrangement is not limited in accordance with the number of times of starting. That is, the controller 100 may cancel prohibition of arrangement of the one-touch selection button 21 in the predetermined region where arrangement thereof is prohibited in accordance with a status of utilization of the process associated with the one-touch selection button 21, arrangement of which in the predetermined region is prohibited.

Here, "status of utilization of process" is an item that indicates the extent of utilization of the process, such as a number of times of execution of the process, a processing time of a processing apparatus and a number of times of receiving the process. However, the status of utilization of the process is not limited to these exemplified items, and a combination of the plural exemplified items or an item to determine the status of utilization of the process by use of information other than these may be used.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A processing apparatus comprising:
   a processor configured to perform a plurality of predetermined processes, and execute a creation unit and an execution portion; and
   a display;
   wherein the creation unit is configured to create a first process receiving portion and a second process receiving portion, the first process receiving portion and the second process receiving portion each being configured to be displayed on the display, the first process receiving portion being configured to receive an instruction to perform a first process from among the plurality of predetermined processes, the second process receiving portion being configured to receive an instruction to perform a second process among the plurality of predetermined processes,
   the execution portion is configured to execute the first process, in a case where the instruction is received by the first process receiving portion, after receiving another instruction, and to execute the second process, in a case where the instruction is received by the second process receiving portion, without receiving another instruction,
   the creation unit is configured to create one of the first process receiving portion and the second process receiving portion in response to an instruction inputted by a user, and
   the creation unit is configured to cause a display of the second process receiving portion to be different from a display of the first process receiving portion in response to the instruction inputted by the user,
   the display is configured to display a confirmation screen that presents setting contents associated with the first process receiving portion in the case where the instruction is received by the first process receiving portion, and
   the first process is executed under the associated setting contents after receiving the another instruction.

2. The processing apparatus according to claim 1, wherein creation of the second process receiving portion is prohibited for a part of the plurality of processes.

3. The processing apparatus according to claim 2, wherein creation of the first process receiving portion is permitted for the part of the plurality of processes.

4. The processing apparatus according to claim 2, wherein the part of the plurality of processes is stipulated by at least one of a kind of the process, a parameter regarding an output of the process and an amount of a resource, except for the processing apparatus, used for the process.

5. The processing apparatus according to claim 2, wherein the creation unit is configured to set the part of the plurality of processes, for which creation of the second process receiving portion is prohibited, in response to an instruction based on preset authority.

6. The processing apparatus according to claim 1, wherein arrangement of the second process receiving portion in a predetermined region where the first process receiving portion is able to be arranged is prohibited.

7. The processing apparatus according to claim 6, wherein prohibition of arrangement of the second process receiving portion in a region where arrangement thereof is prohibited is canceled or is able to be canceled based on a status of utilization of a process by the processor.

8. The processing apparatus according to claim 6, wherein the predetermined region is set on a top left side of the display region relative to a center thereof.

9. The processing apparatus according to claim 6, wherein
the display is configured to display a first display screen and a second display screen, and
the first process receiving portion is able to be arranged in both the first display screen and the second display screen, whereas, arrangement of the second process receiving portion in the first display screen is prohibited.

10. The processing apparatus according to claim 9, wherein the first display screen is displayed in priority to the second display screen.

11. The processing apparatus according to claim 6, wherein prohibition of arrangement of the second process receiving portion in a region where arrangement thereof is prohibited is canceled based on a status of utilization of a process by the processor.

12. A non-transitory computer readable medium storing a program that causes a computer to execute a process comprising:
causing a processing unit to perform a plurality of predetermined processes;
causing a display unit to display;
creating a first process receiving portion and a second process receiving portion, the first process receiving portion and the second process receiving portion each being configured to be displayed on the display unit, the first process receiving portion being configured to receive an instruction to perform a first process from among the plurality of predetermined processes, the second process receiving portion being configured to receive an instruction to perform a second process among the plurality of predetermined processes; and
executing the first process, in a case where the instruction is received by the first process receiving portion, after receiving another instruction, and executing the second process, in a case where the instruction is received by the second process receiving portion, without receiving another instruction,
creating one of the first process receiving portion and the second process receiving portion in response to an instruction inputted by a user,
causing the first processing receiving portion to be displayed differently from the second processing receiving portion in response to the instruction inputted by the user, and
causing a confirmation screen that presents setting contents associated with the first process receiving portion to be displayed in the case where the instruction is received by the first process receiving portion,
wherein the first process is executed under the associated setting contents after receiving the another instruction.

13. The non-transitory computer readable medium storing a program according to claim 12, wherein arrangement of the second process receiving portion in a predetermined region where the first process receiving portion is able to be arranged is prohibited.

14. The non-transitory computer readable medium storing a program according to claim 12, wherein the process further comprises displaying, with the display unit, a first display screen and a second display screen, and
wherein the first process receiving portion is able to be arranged in both the first display screen and the second display screen, and the second process receiving portion is prohibited from being arranged in the first display screen.

15. The processing apparatus according to claim 1, wherein the creation unit is configured to cause the display of the second process receiving portion to be different from the display of the first process receiving portion such that a mark is added to the second process receiving portion.

16. The processing apparatus according to claim 1, wherein the first process receiving portion and the second process receiving portion are arranged on a same display screen.

* * * * *